United States Patent
Constantinescu

(10) Patent No.: US 10,846,777 B2
(45) Date of Patent: Nov. 24, 2020

(54) SYSTEM FOR PROVIDING A PERSONALIZED CONCIERGE SERVICE

(71) Applicant: Sihem Constantinescu, Redmond, WA (US)

(72) Inventor: Sihem Constantinescu, Redmond, WA (US)

(*) Notice: Subject to any disclaimer, the term of this patent is extended or adjusted under 35 U.S.C. 154(b) by 41 days.

(21) Appl. No.: 16/383,396

(22) Filed: Apr. 12, 2019

(65) Prior Publication Data
US 2019/0318412 A1    Oct. 17, 2019

Related U.S. Application Data

(60) Provisional application No. 62/656,710, filed on Apr. 12, 2018.

(51) Int. Cl.
| | |
|---|---|
| *G06Q 30/00* | (2012.01) |
| *G06Q 30/06* | (2012.01) |
| *G06F 16/9535* | (2019.01) |
| *H04L 29/08* | (2006.01) |
| *G06N 20/00* | (2019.01) |
| *G06F 16/9538* | (2019.01) |

(52) U.S. Cl.
CPC ..... *G06Q 30/0631* (2013.01); *G06F 16/9535* (2019.01); *G06F 16/9538* (2019.01); *G06N 20/00* (2019.01); *H04L 67/10* (2013.01)

(58) Field of Classification Search
CPC .............. G06Q 30/0631; G06N 20/00; G06F 16/9535; G06F 16/9538; H04L 67/10
See application file for complete search history.

(56) References Cited

U.S. PATENT DOCUMENTS

| | | | |
|---|---|---|---|
| 2013/0054698 A1* | 2/2013 | Lee | G06Q 30/0267 709/204 |
| 2016/0086104 A1* | 3/2016 | Wouhaybi | G06Q 50/01 705/5 |

OTHER PUBLICATIONS

Cheung, William K., et al. "Mining customer preference ratings for product recommendation using the support vector machine and the latent class model." WIT Transactions on Information and Communication Technologies 25 (2000). (Year: 2000).*

* cited by examiner

*Primary Examiner* — Matthew E Zimmerman
(74) *Attorney, Agent, or Firm* — Olympic Patent Works PLLC

(57) ABSTRACT

The current document is directed to an automated concierge service that facilitates identifying, by users, various types of events, services, venues, and other things of interest to the users and that facilitates arranging, by users, attendance at, consumption of, or participation in selected events, services, venues, and other things of interest. The automated concierge service employs machine-learning methodologies to continue to learn, over time, users' personal preferences, behavioral patterns, social relationships, schedules, and other characteristics and parameters, so that the automated concierge service can provide users with precise, easy to assimilate options and recommendations. The automated concierge service interfaces to a variety of different online services and information sources to facilitate users' participation in recommended activities, attendance at recommended events, and consumption of recommended services, including scheduling and making reservations, informing other group participants of events and services, and arranging for transportation.

1 Claim, 31 Drawing Sheets

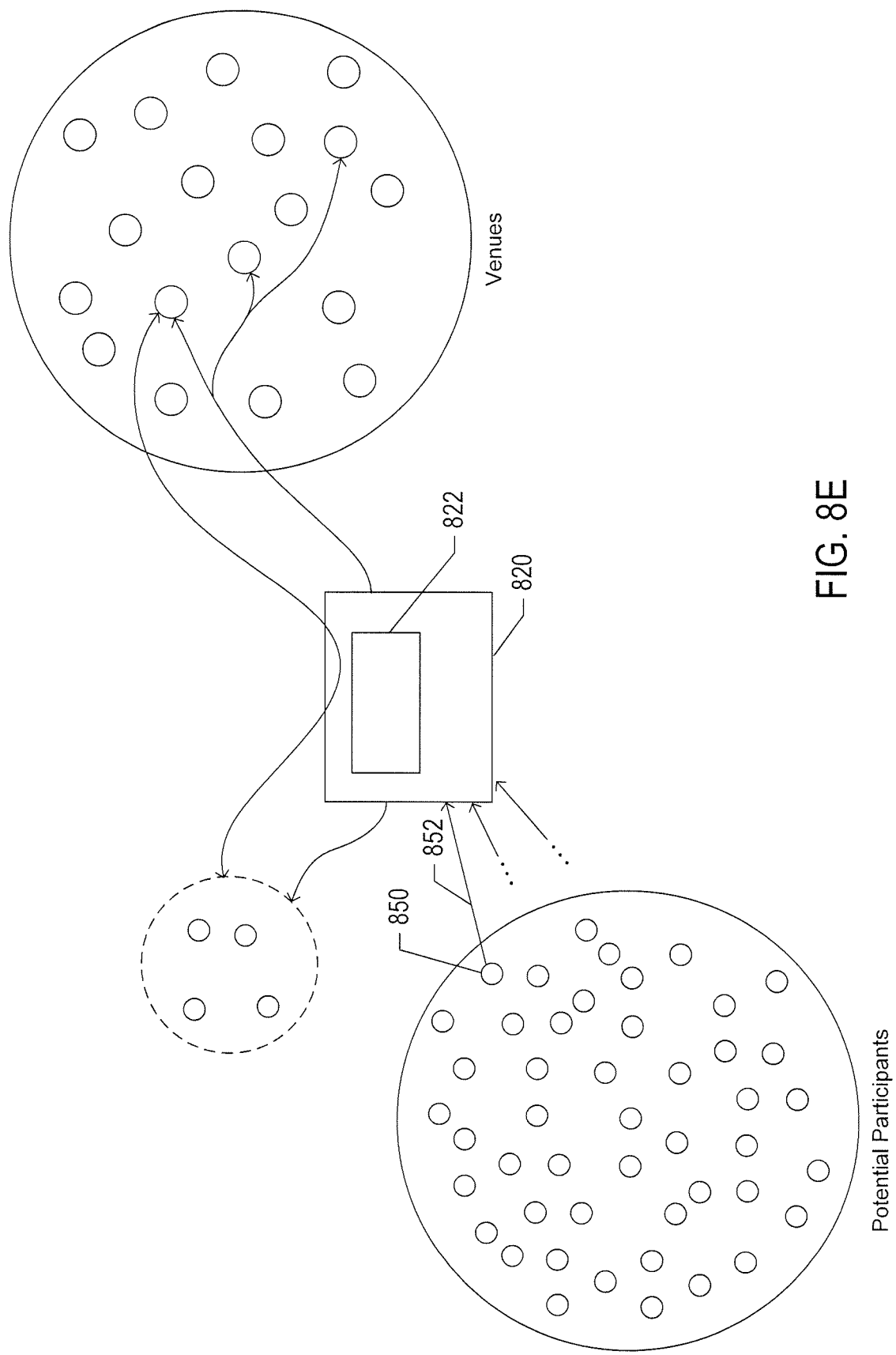

SYSTEM FOR PROVIDING A PERSONALIZED CONCIERGE SERVICE

CROSS-REFERENCE TO RELATED APPLICATION

This application claims the benefit of Provisional Application No. 62/656,710, filed Apr. 12, 2019.

TECHNICAL FIELD

The current document is directed to personal-assistant applications and, in particular, to a personal-assistant application that incorporates various machine-learning methodologies to learn preferences, behavioral patterns, social relationships, and other characteristics of users to which the personal-assistant application provides concierge-like services.

BACKGROUND

With the advent of cloud computing, cloud-computing-based applications and services, and sophisticated personal computational and communication devices, including smart phones, the infrastructure needed for providing timely personal assistance to users through services and applications is now widely available. In fact, a wide variety of different types of personal-assistant and recommendation systems and applications have been developed during the past 15 years. However, many of these personal-assistant and recommendations systems are associated with significant deficiencies. For one thing, many of these systems provide far more information, selections, and options to users than the users can efficiently review and choose from. Part of the reason for these types of information-overload-engendering user interfaces is that the systems base their recommendations on only a few relatively static parameters supplied by users. Another disadvantage is that the currently available personal assistance and recommendations systems often fail to aggregate the individual services needed by users in order to take advantage of recommended events, venues, services, and items. Furthermore, in addition to providing too much information, many of the currently available personal-assistant and recommendations systems have complicated user interfaces that cannot be quickly and conveniently navigated by users wishing to arrange and reserve particular types of services and venues. Yet another deficiency is the lack of convenient facilities and features for organizing group activities. For all of these reasons, users continue to seek more efficient and effective personal-assistant and recommendation systems to facilitate arranging activities.

SUMMARY

The current document is directed to an automated concierge service that facilitates identifying, by users, various types of events, services, venues, and other things of interest to the users and that facilitates arranging, by users, attendance at, consumption of, or participation in selected events, services, venues, and other things of interest. The automated concierge service employs machine-learning methodologies to continue to learn, over time, users' personal preferences, behavioral patterns, social relationships, schedules, and other characteristics and parameters, so that the automated concierge service can provide users with precise, easy to assimilate options and recommendations. The automated concierge service interfaces to a variety of different online services and information sources to facilitate users' participation in recommended activities, attendance at recommended events, and consumption of recommended services, including scheduling and making reservations, informing other group participants of events and services, and arranging for transportation.

BRIEF DESCRIPTION OF THE DRAWINGS

FIGS. 8A-E illustrate automated user-to-venue matching, an example of the attribute-based matching methods which underlie many specific automated concierge services.

DETAILED DESCRIPTION

Figure 1:
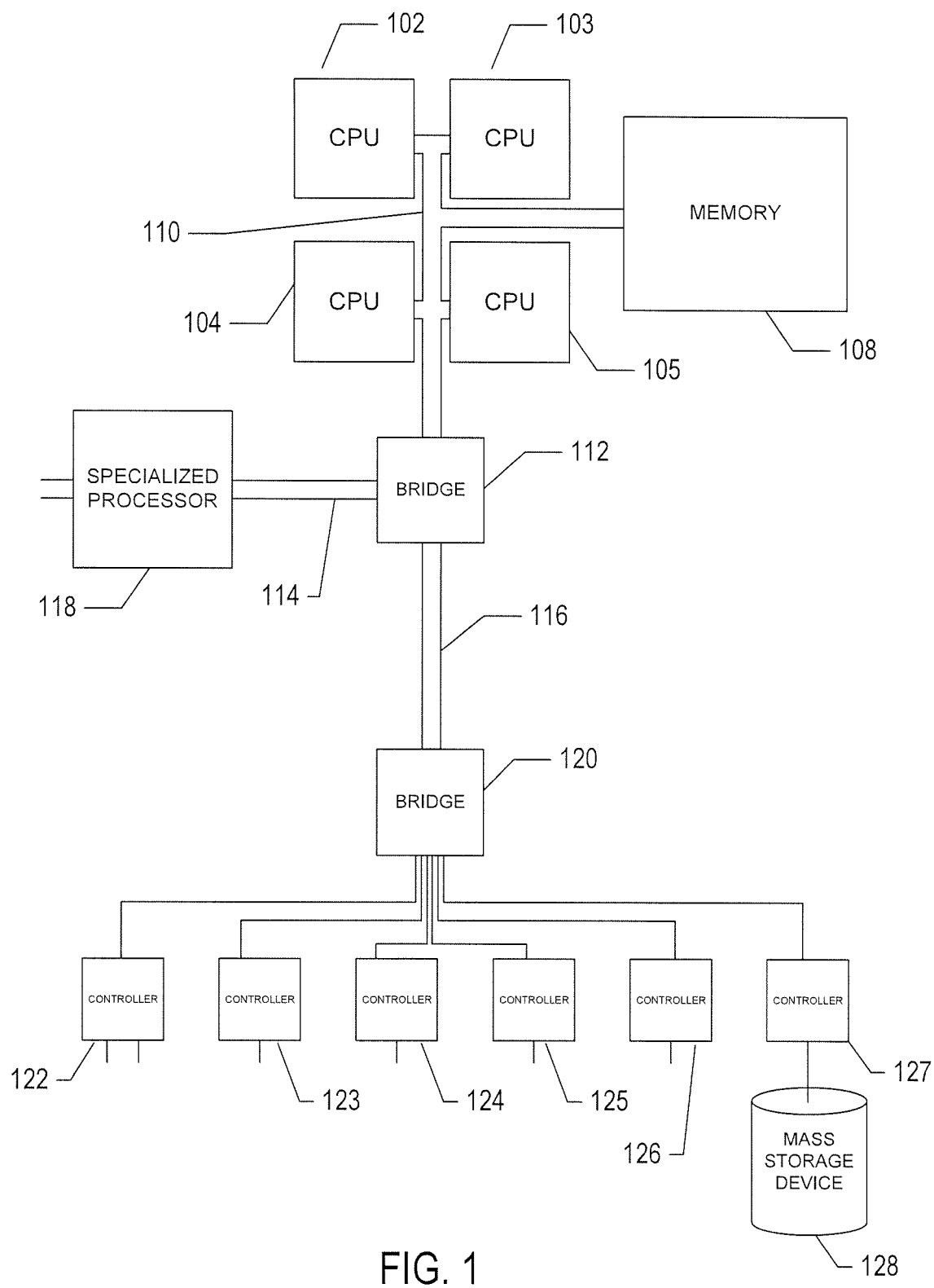
FIG. 1 provides a general architectural diagram for various types of computers.

The current document is directed to a machine-learning-based automated concierge service. A first subsection discusses computer hardware, computer systems, and other aspects of the electromechanical machinery controlled by machine-learning-based automated concierge service. In a following subsection, the currently disclosed automated concierge service is discussed, in detail.

Computer Hardware, Complex Computational Systems, and Virtualization

The terms "virtual" and "abstraction" are not, in any way, intended to mean or suggest an abstract idea or concept or some type of disembodied theory or design. Computational abstractions are tangible, physical interfaces that are implemented, ultimately, using physical computer hardware, data-storage devices, and communications systems. Virtual machines and other virtual resources are implemented in physical resources and generally include one or more additional layers of abstraction in addition to the physical resources. The term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such assertions are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine.

FIG. 1 provides a general architectural diagram for various types of computers. Computers that implement all or a portion of a machine-learning-based system may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. Such distributed computing systems provide diverse arrays of functionalities. For example, a PC or smart-phone user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 2:
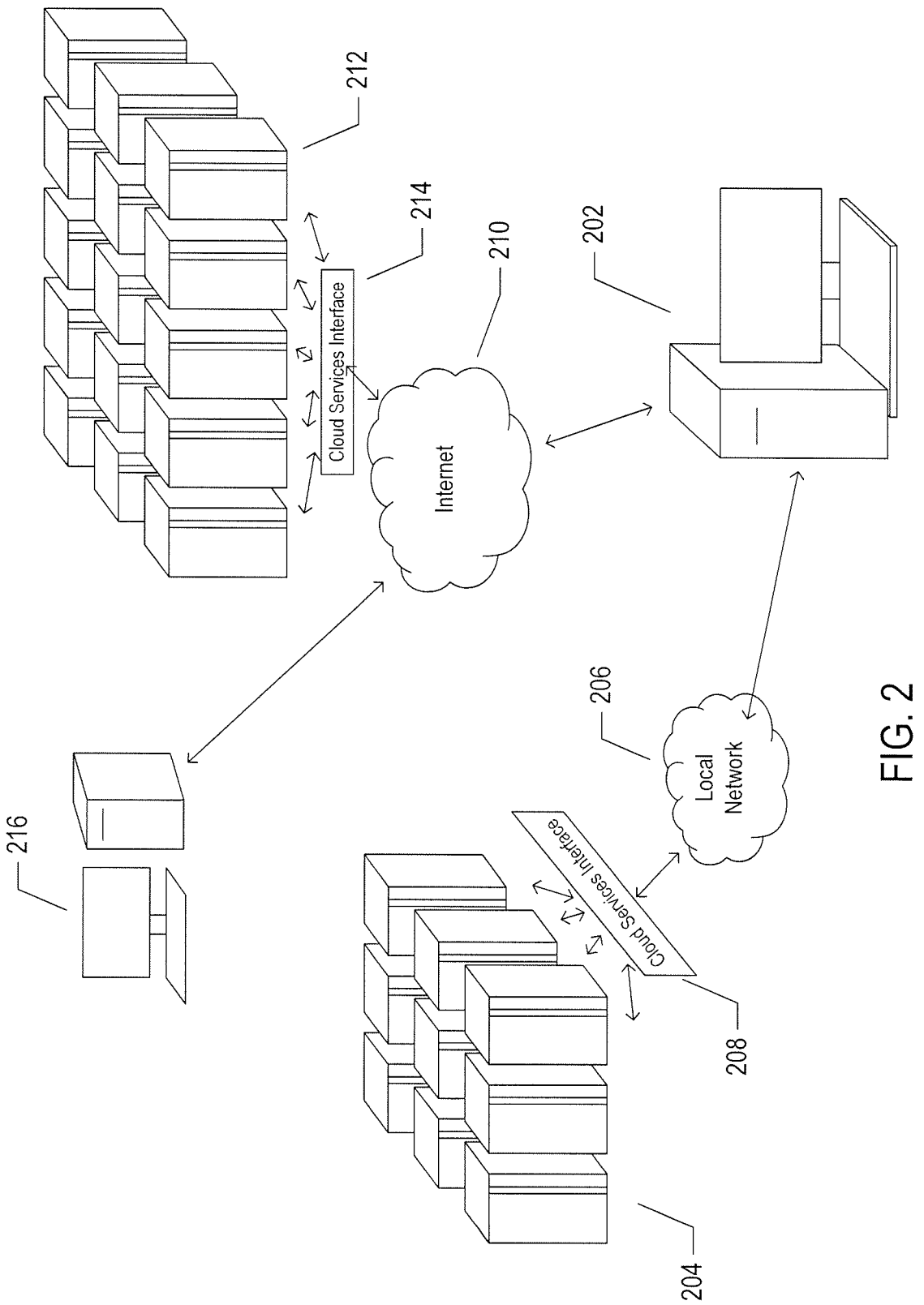
FIG. 2 illustrates cloud computing.

FIG. 2 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 2, a system administrator for an organization, using a PC 202, accesses the organization's private cloud 204 through a local network 206 and private-cloud interface 208 and also accesses, through the Internet 210, a public cloud 212 through a public-cloud services interface 214. The administrator can, in either the case of the private cloud 204 or public cloud 212, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 216.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 3:
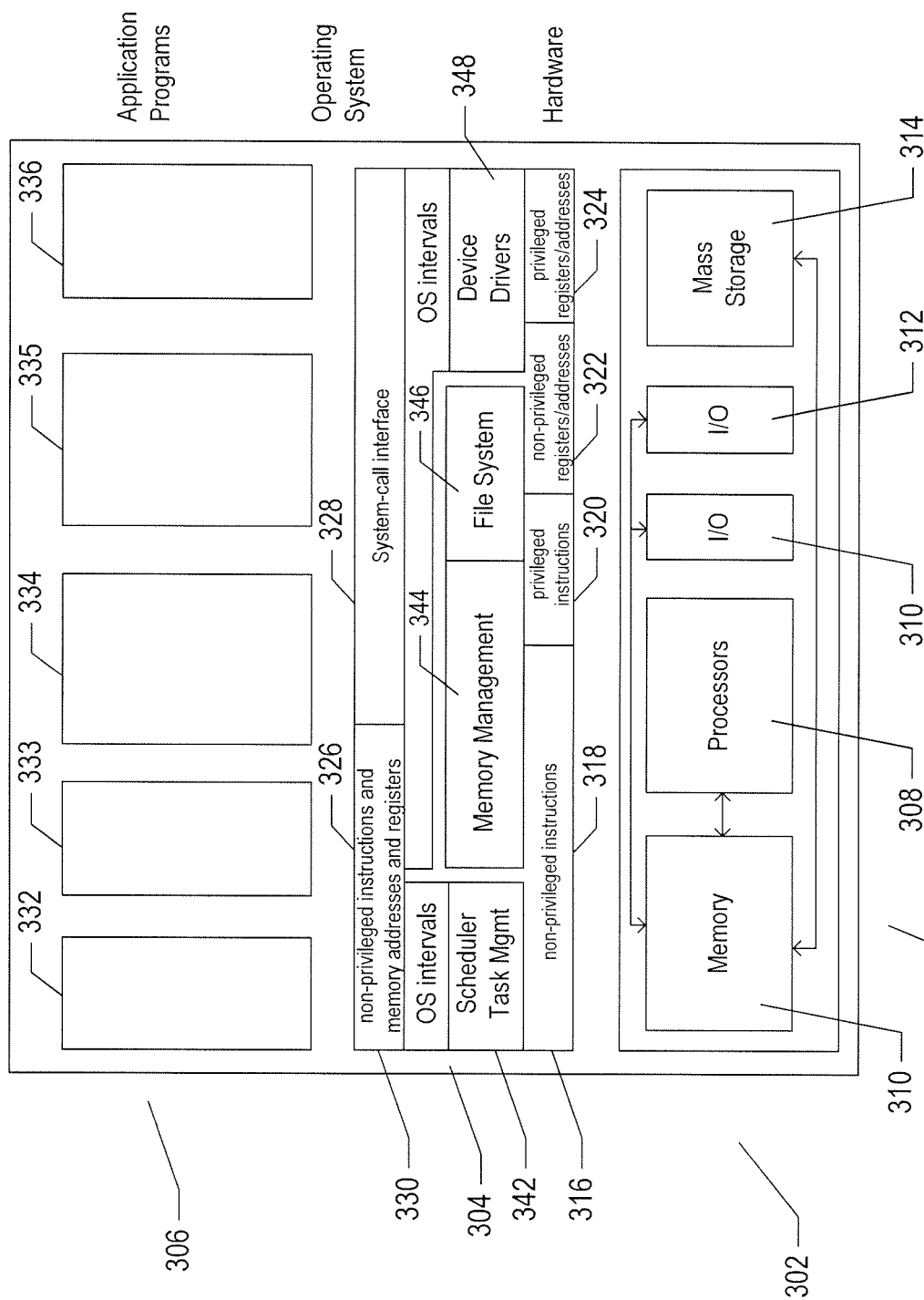
FIG. 3 illustrates generalized hardware and software components of a general-purpose computer system, such as a general-purpose computer system having an architecture similar to that shown in FIG. 1.

FIG. 3 illustrates generalized hardware and software components of a general-purpose computer system, such as a general-purpose computer system having an architecture similar to that shown in FIG. 1, including servers used in cloud-computing facilities. The computer system 300 is often considered to include three fundamental layers: (1) a hardware layer or level 302; (2) an operating-system layer or level 304; and (3) an application-program layer or level 306. The hardware layer 302 includes one or more processors 308, system memory 310, various different types of input-output ("I/O") devices 310 and 312, and mass-storage devices 314. Of course, the hardware level also includes many other components, including power supplies, internal communications links and busses, specialized integrated circuits, many different types of processor-controlled or microprocessor-controlled peripheral devices and controllers, and many other components. The operating system 304 interfaces to the hardware level 302 through a low-level operating system and hardware interface 316 generally comprising a set of non-privileged computer instructions 318, a set of privileged computer instructions 320, a set of non-privileged registers and memory addresses 322, and a set of privileged registers and memory addresses 324. In general, the operating system exposes non-privileged instructions, non-privileged registers, and non-privileged memory addresses 326 and a system-call interface 328 as an operating-system interface 330 to application programs 332-336 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 342, memory management 344, a file system 346, device drivers 348, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 336 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 4:
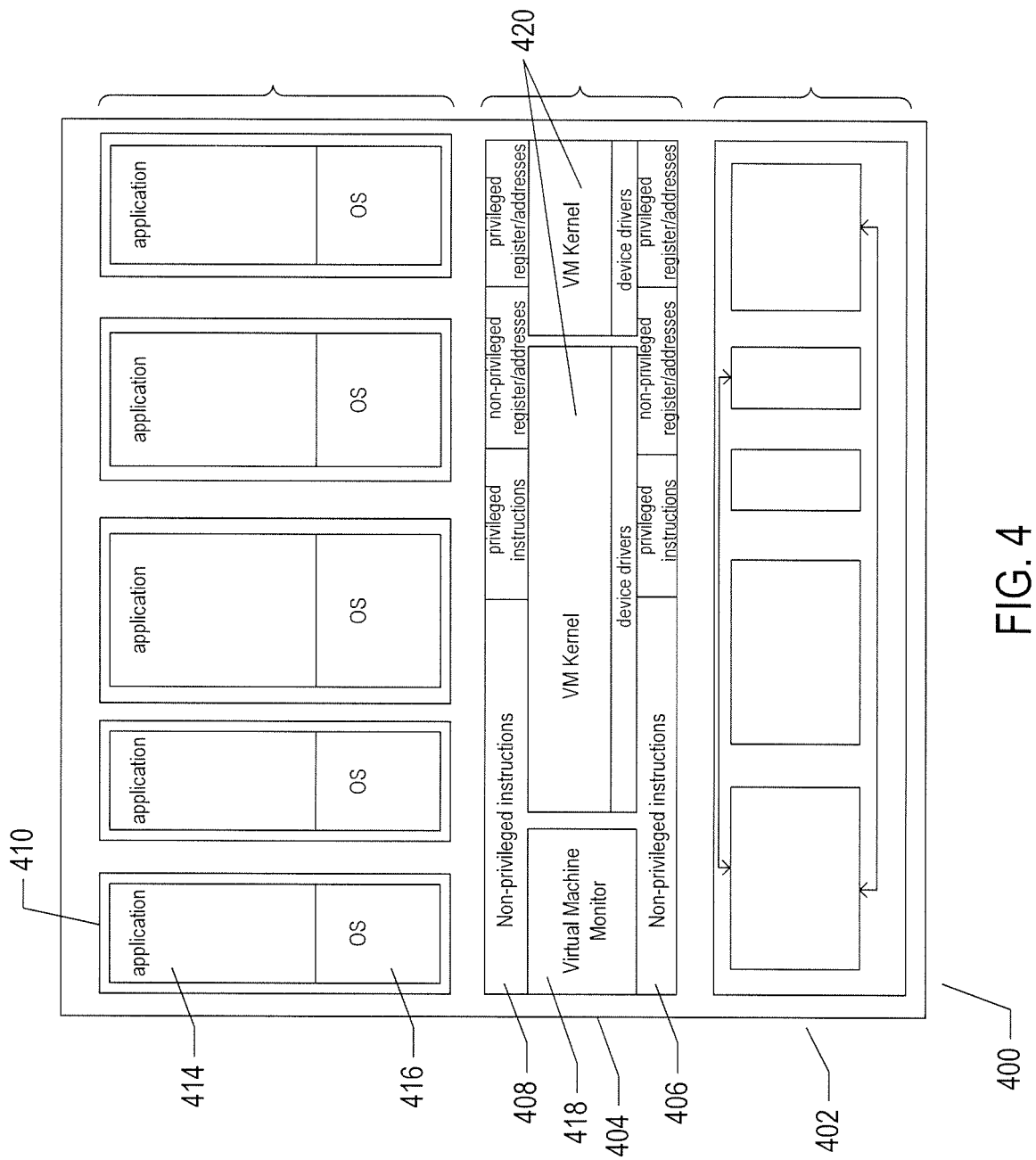
FIG. 4 illustrates one type of virtual machine and virtual-machine execution environment.

For all of these reasons, a higher level of abstraction, referred to as the "virtual machine," has been developed and evolved to further abstract computer hardware in order to address many difficulties and challenges associated with traditional computing systems, including the compatibility issues discussed above. FIG. 4 illustrates one type of virtual machine and virtual-machine execution environment. FIG. 4 uses the same illustration conventions as used in FIG. 3. FIG. 4 shows a first type of virtualization. The computer system 400 in FIG. 4A includes the same hardware layer 402 as the hardware layer 302 shown in FIG. 3. However, rather than providing an operating system layer directly above the hardware layer, as in FIG. 3, the virtualized computing environment illustrated in FIG. 4A features a virtualization layer 404 that interfaces through a virtualization-layer/hardware-layer interface 406, equivalent to interface 316 in FIG. 3, to the hardware. The virtualization layer provides a hardware-like interface 408 to a number of virtual machines, such as virtual machine 410, executing above the virtualization layer in a virtual-machine layer 412. Each virtual machine includes one or more application programs or other higher-level computational entities packaged together with an operating system, referred to as a "guest operating system," such as application 414 and guest operating system 416 packaged together within virtual machine 410. Each virtual machine is thus equivalent to the operating-system layer 304 and application-program layer 306 in the general-purpose computer system shown in FIG. 3. Each guest operating system within a virtual machine interfaces to the virtualization-layer interface 408 rather than to the actual hardware interface 406. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 408 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 418 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 408, the accesses result in execution of virtualization-layer code to simulate or emulate the privileged resources. The virtualization layer additionally includes a kernel module 420 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 5:
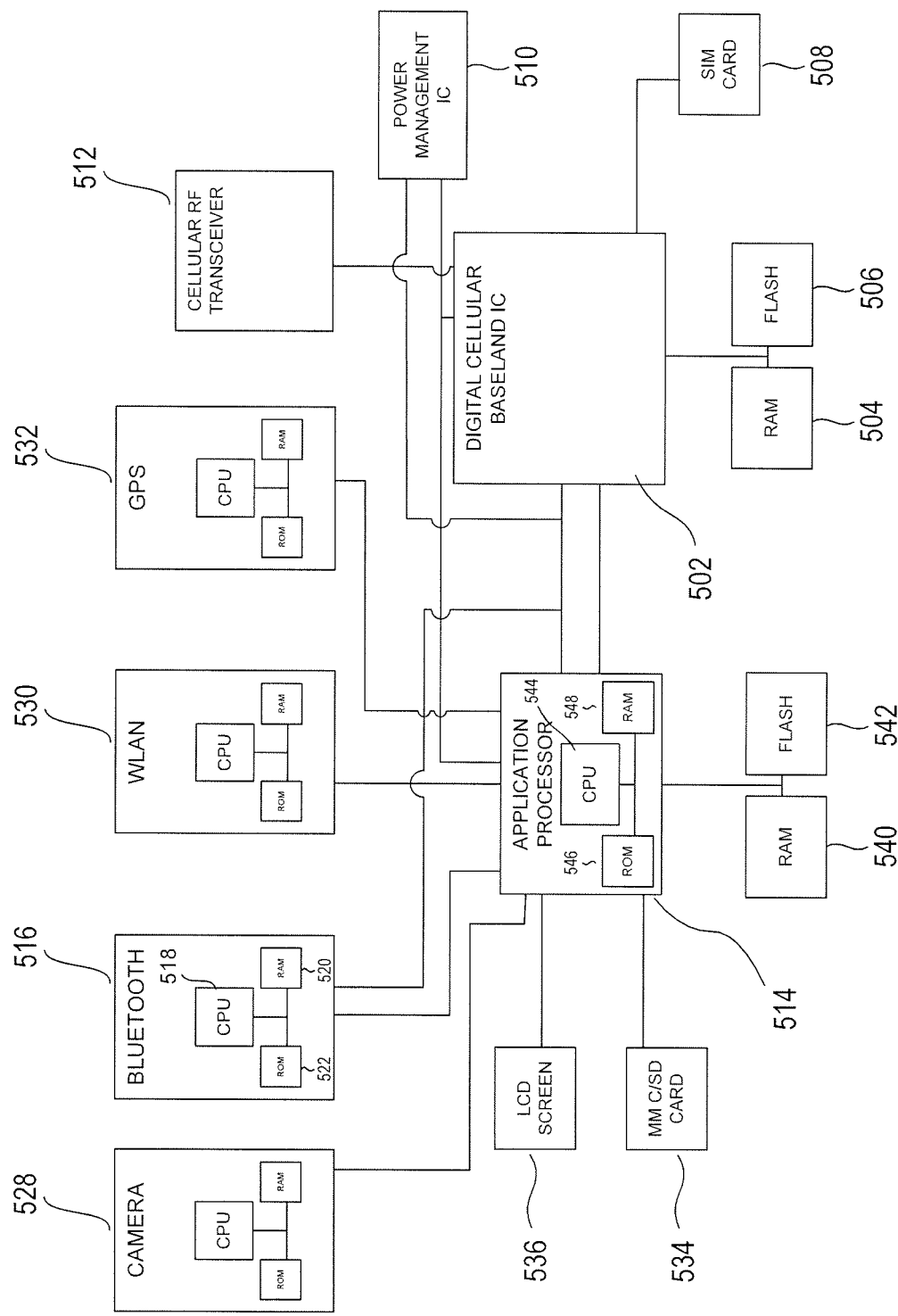
FIG. 5 provides a high-level block diagram for certain of the internal components of a cell phone.

FIG. 5 provides a high-level block diagram for certain of the internal components of a cell phone. These components include a dual-core digital cellular baseband integrated circuit 502, which converts analog radio signals to digital signals and digital signals to analog signals, manages communications-protocol layers, and runs certain cell telephone applications, including applications responsible for initiation of phone-calls and maintenance of a locally-stored phone book, and a portion of the cell-phone user interface. The digital cellular baseband integrated circuit is interconnected with external RAM 504 and flash 506 memory, a subscriber identity module ("SIM"), or SIM card, 508, a power-management integrated circuit 510, a cellular radio-frequency ("RF") transceiver 512, a separate application processor integrated circuit 514, and a Bluetooth module 516 that includes a processor 518 and both RAM 520 and ROM memory 522. The application processor 514 provides the computational bandwidth to a variety of non-radio-communications applications, including digital-camera-based applications, Internet browser, games, networking, and GPS-related functions. An application processor may be connected to a video camera 528, a WLAN module 530, a GPS module 532, an MMC/SD card 534, and an LCD screen 536. The application processor is additionally interconnected with external RAM 540 and flash 542 memory, and includes a processor 544 and internal ROM 546 and RAM 548 memory. On modern cell phones, the display screen 536 is generally a touch screen that both displays graphics, text, and images and that receives user input. The user input includes touch input at particular screen positions and/or continuous motions including one or more of initial points of motion, directions and paths of motion, and final points at which the motion stops.

Figure 6:
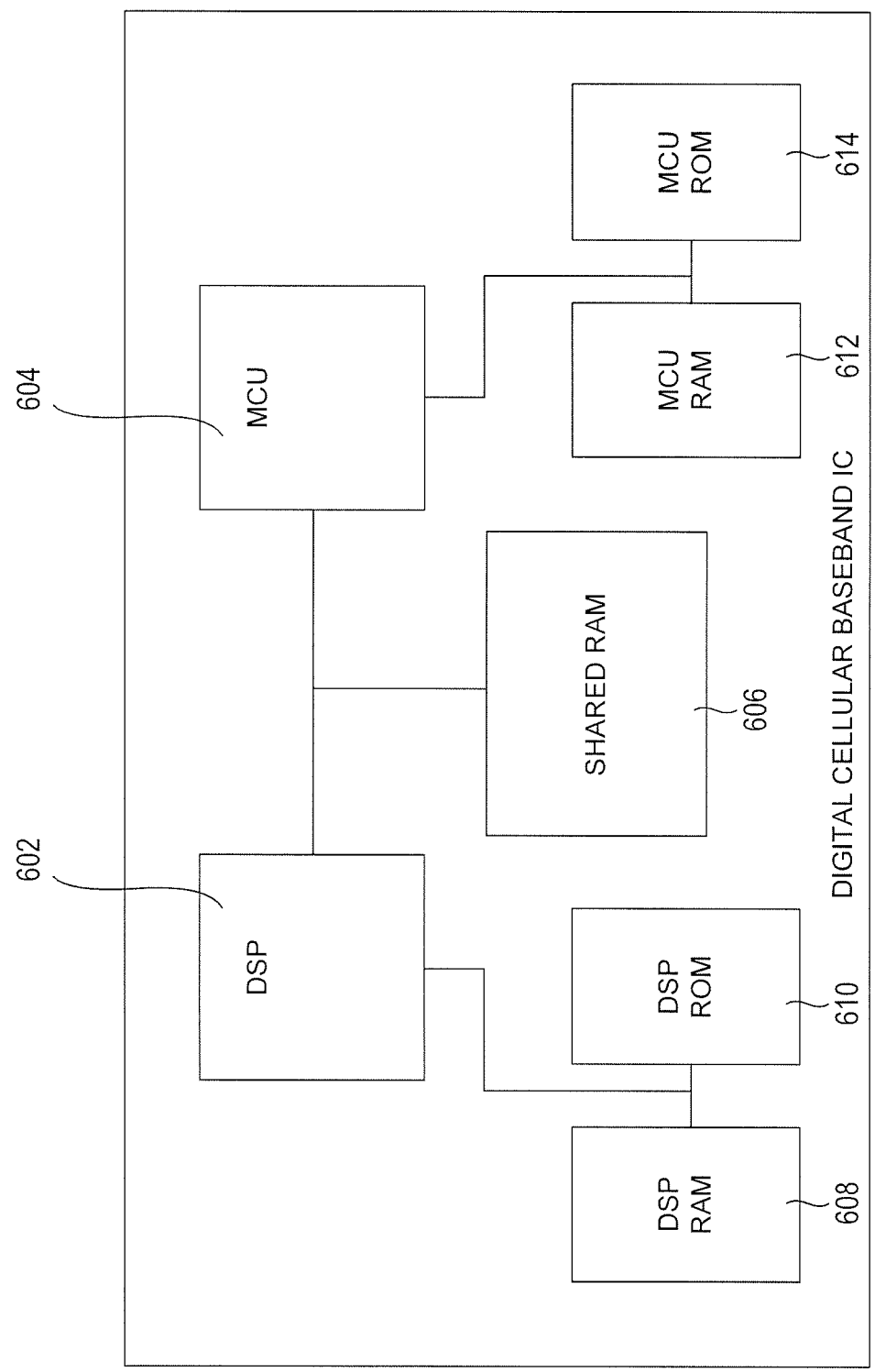
FIG. 6 shows a high-level block diagram for a digital cellular baseband integrated circuit.

FIG. 6 shows a high-level block diagram for a digital cellular baseband integrated circuit. The digital cellular baseband integrated circuit includes a digital signal processor ("DSP") 602, a microcontroller 604, shared internal RAM 606, and DSP-associated RAM 608 and ROM 610 as well as microcontroller-associated RAM 612 and ROM 614.

Figure 7:
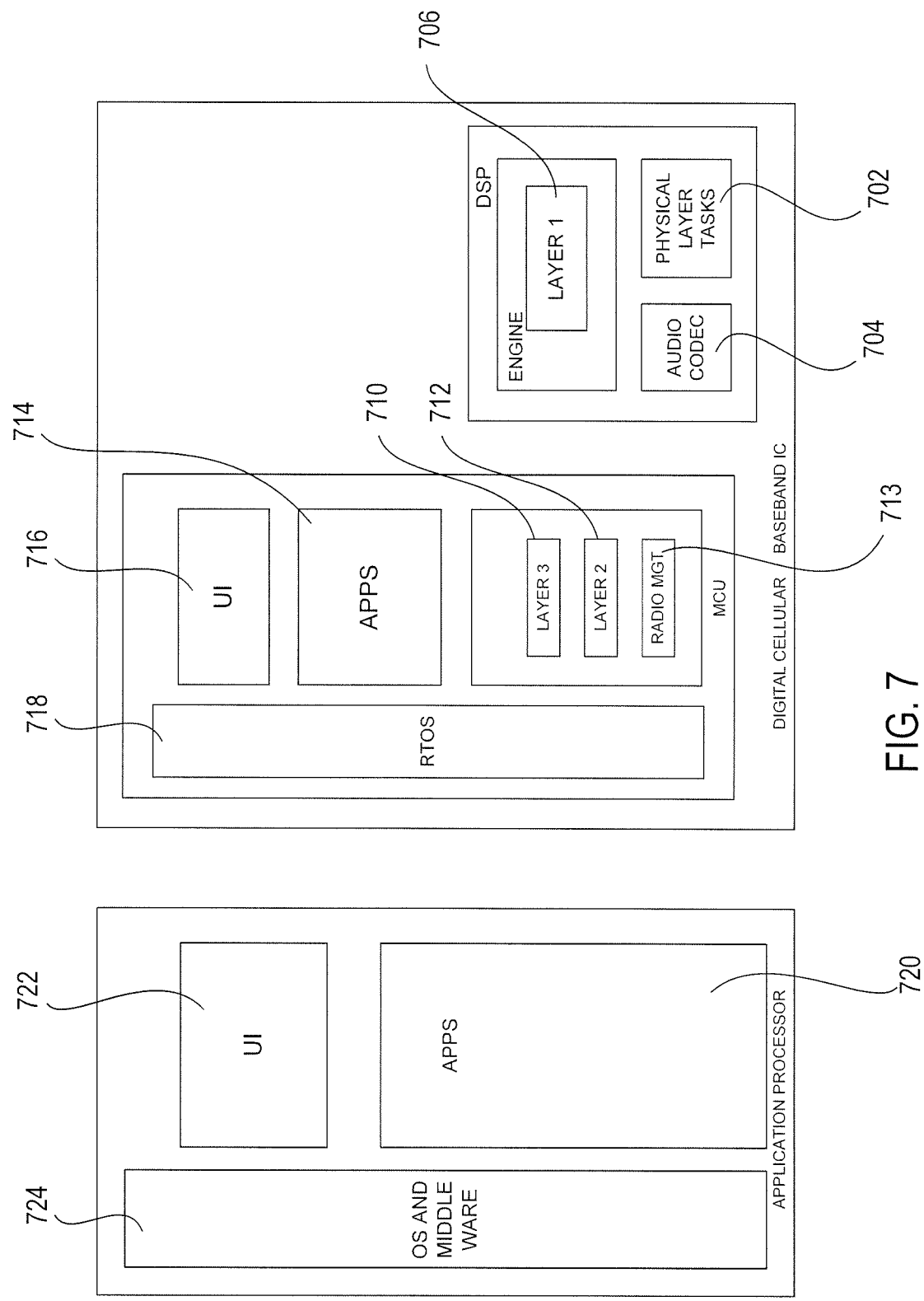
FIG. 7 provides a high-level block diagram of the software architecture for a cellular telephone.

FIG. 7 provides a high-level block diagram of the software architecture for a cellular telephone. The DSP (602 in FIG. 6) is responsible for the physical layer of the protocol stack associated with RF broadcast and reception 702, provides an audio codec 704, and carries out tasks associated with the first layer of a three-layer communications-protocol stack 706. The microcontroller (604 in FIG. 6) executes software that implements the upper two layers of the three-layer protocol stack 710 and 712, various radio-management functions 714, and executes certain applications 714 and user-interface routines 716 layered above a real-time operating system 718. For example, the microcontroller may store and manage a local phone book and provide a user-interface ("UI") for initiating and answering phone calls, via a phone application the executes on the microcontroller. The application processor (614 in FIG. 6) runs numerous software applications 720 and UI routines 722 above an operating system and a middle-ware layer 724.

A cell phone thus generally contains, at a minimum, three processors, including an application processor, microcontroller, and DSP, and often as many as six or more processors, including processors within separate Bluetooth, GPS, and WLAN modules. The cell phone includes various different electronic memories, some integrated with the processors and others external to the processors and interconnected with the processors via memory busses.

The Currently Disclosed Methods and Systems

In order to address the deficiencies, discussed above, inherent in currently available automated personal assistance and recommendations systems, the current document discloses an automated concierge service that employs machine-learning techniques to learn, over time, and to continue learning preferences, behavioral patterns, social relationships, and other characteristics of users. This allows the currently disclosed automated concierge service to provide highly personalized and highly relevant recommendations and related services to users. The currently disclosed automated concierge service is optimized to find various types of events, venues, services, and other items of interest available to a user within the next 24 hours and to provide related services and information to facilitate attending, participating in, and/or consuming selected events, venues, and services, including scheduling and reservation services, ticket purchases, organizing and informing additional participants, and arranging for transportation in the same way that a skilled human concierge familiar with a client can assist the client to find and participate in various different types of activities. Because the automated concierge service learns the preferences and characteristics of users, the automated concierge services is able to provide simple and easy-to-assimilate recommendations and related services, rather than needlessly inundating users with large amounts of information about events, venues, and services of little or no interest to users.

FIGS. 8A-E illustrate automated user-to-venue matching, an example of the attribute-based matching methods which underlie many specific automated concierge services. In this example, venues are used as an example of the various different events, venues, services, items, and other things of potential interest to a user of the automated concierge service, referred to as a "potential participant" in the example of FIGS. 8A-E.

Figure 8A:
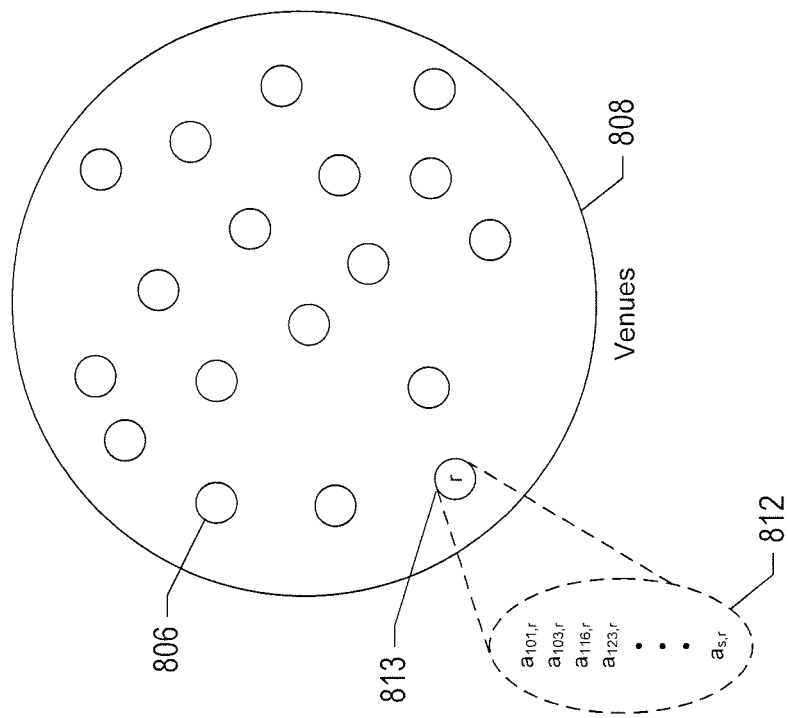
Figure 8A:
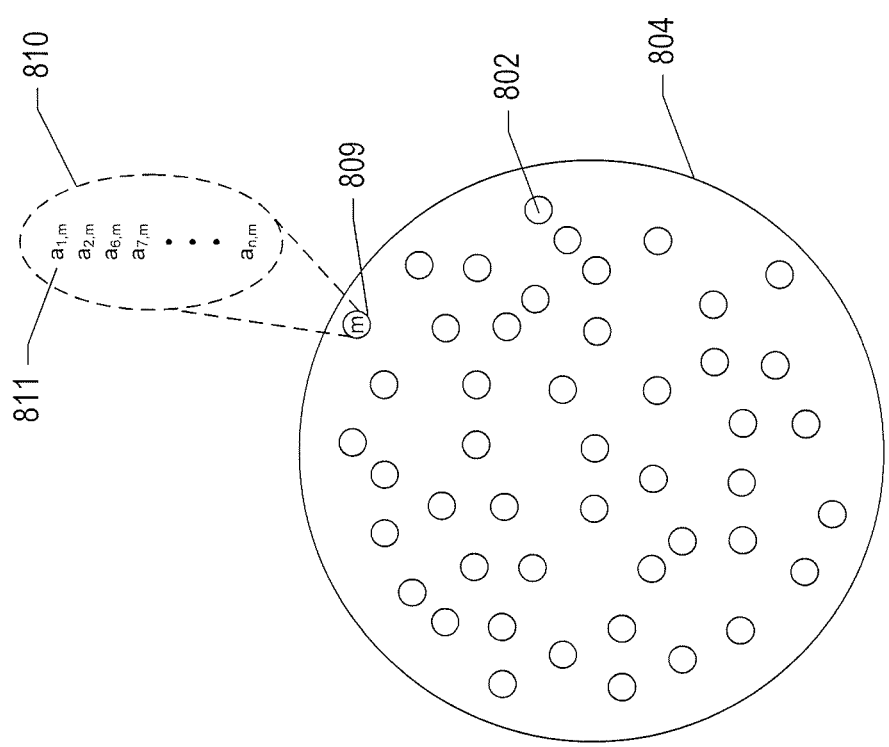

FIG. 8A illustrates the association of attributes with potential participants and with values. In FIG. 8A, small disks, such as disk 802, within the circular area 804 represent potential participants among the automated-concierge-service users and small disks, such as disk 806, within the circular area 808 represent various different venues currently available to the potential participants 804. Each potential participant, such as potential participant in 809, is associated with a set of attribute values, with the attribute values associated with potential participant in 809 shown within inset 810. Each attribute value is represented by the doubly subscripted letter "a." For example, an initial attribute value is represented by the notation "$a_1,m$" 811 within inset 810. In this notation, "$a_1$" represents a first attribute and "m" represents potential participant m. Thus, the notation "$a_1,m$" represents the value of attribute $a_1$ for potential participant m. Any potential participant, or automated-concierge-service user, may be associated with values for some subset of the set of attributes that may be associated with potential participants. Thus, the attributes $a_1, a_2, \ldots, a_n$, are common to potential participants, in general. Examples of attributes may include age, favorite genre of movie, gender, profession, and other such attributes that describe characteristics of potential participants. However, as can be seen by the attribute values listed in inset 810, a given potential participant may be associated only with values for a subset of the total set of potential-participant attributes. In other words, considering the set of potential-participant attributes as dimensions for a potential-participant attribute vector, the attribute vector associated with a given potential participant may be sparse, containing only non-null values for a subset of the dimensions. Similarly, as shown by inset 812, each venue, such as the venue r 813, is also associated with a venue attribute vector.

Figure 8B:
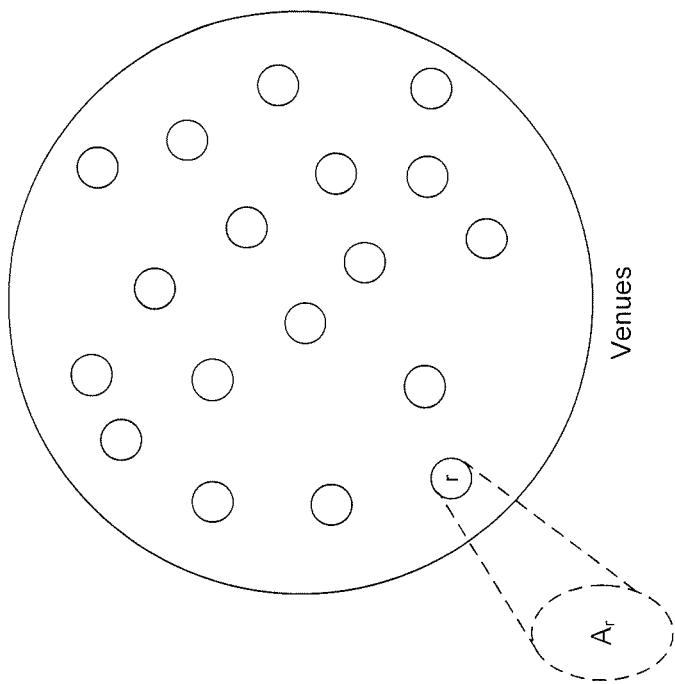
Figure 8B:
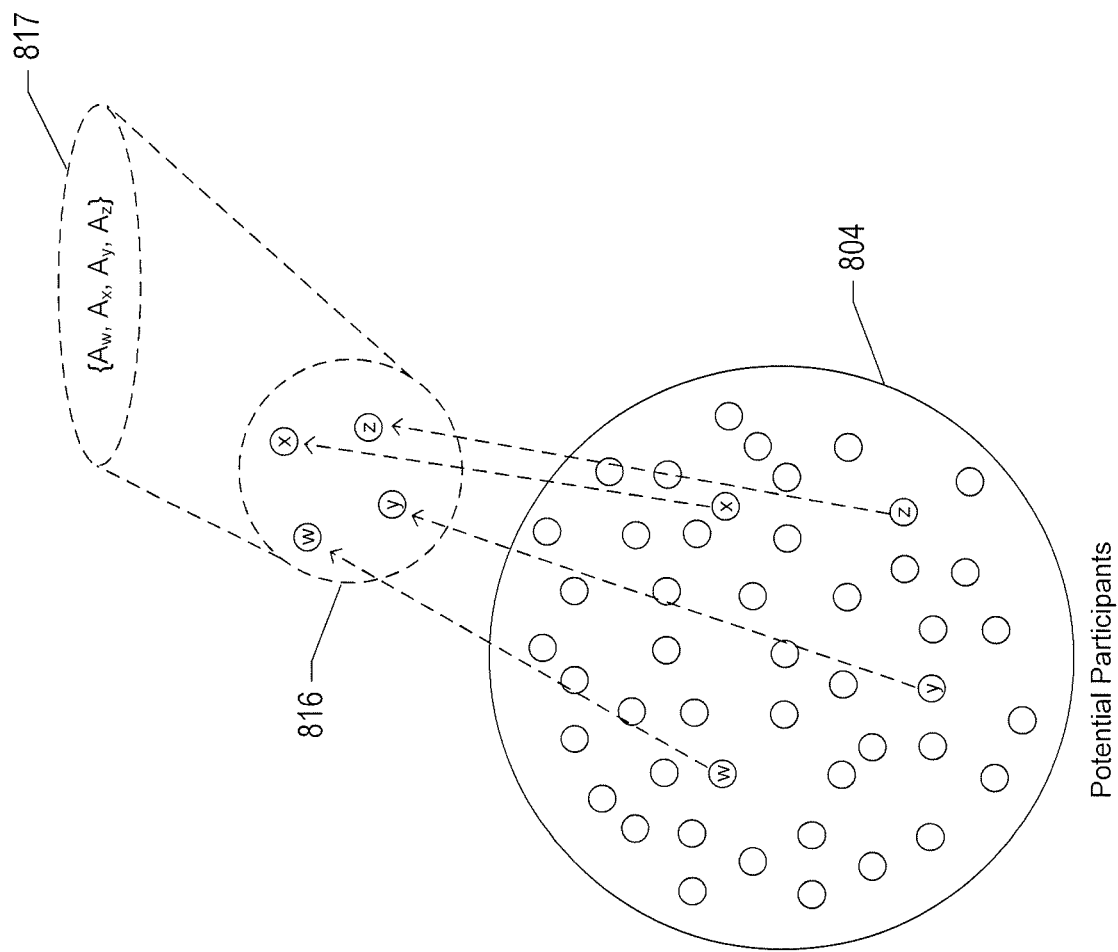

FIG. 8B illustrates attributes associated with a group of potential participants. A group of potential participants 816 includes a subset of the set of potential participants 804. A group of potential participants 816 is associated with a set of attribute vectors, as shown in inset 817 in FIG. 8B. Alternatively, the group of potential participants may be thought of as associated with the attribute vector that may include sets of values, rather than individual values, for one or more dimensions.

Figure 8C:
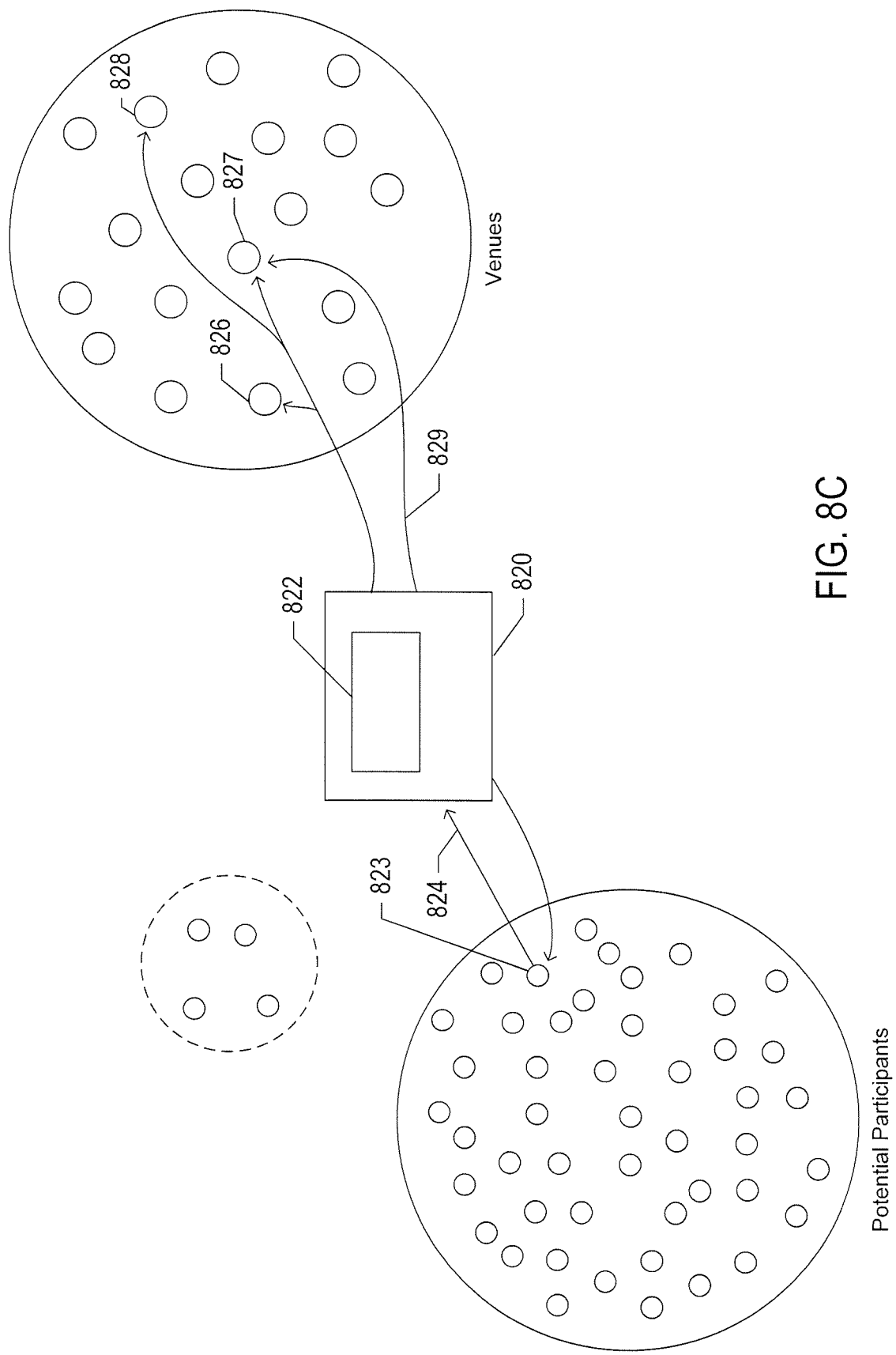

FIG. 8C illustrates a fundamental matching operation carried out by the automated concierge service. In FIG. 8C, the automated concierge service is represented by an outer rectangle 820 and the matching functionality within the automated concierge service is represented by an inner rectangle 822. A potential participant 823 requests a recommendation for venues from the automated concierge service, as represented by arrow 824. The matching functionality within the automated concierge service uses the attribute vector associated with the requesting potential participant and the attribute-value vectors associated with the values in order to identify a small number of best-matching venues 826-828. These identified venues are returned as a recommendation by the automated concierge service, following which the potential participant 823 selects a venue 827 from among the recommended venues, establishing an association between the potential participant and the selected venue represented in FIG. 8C by double-headed arrow 829. The automated concierge service then provides an array of services to facilitate attendance, by the potential participant, of an event offered by the venue. For example, the venue may be a restaurant and the automated concierge service may reserve a table for the potential participant and arrange for transportation to and/or from the restaurant. As another example, the venue may be a movie theater and the automated concierge service may purchase a ticket on behalf of the potential participant and arrange for transportation to and/or from the movie theater.

Figure 8D:
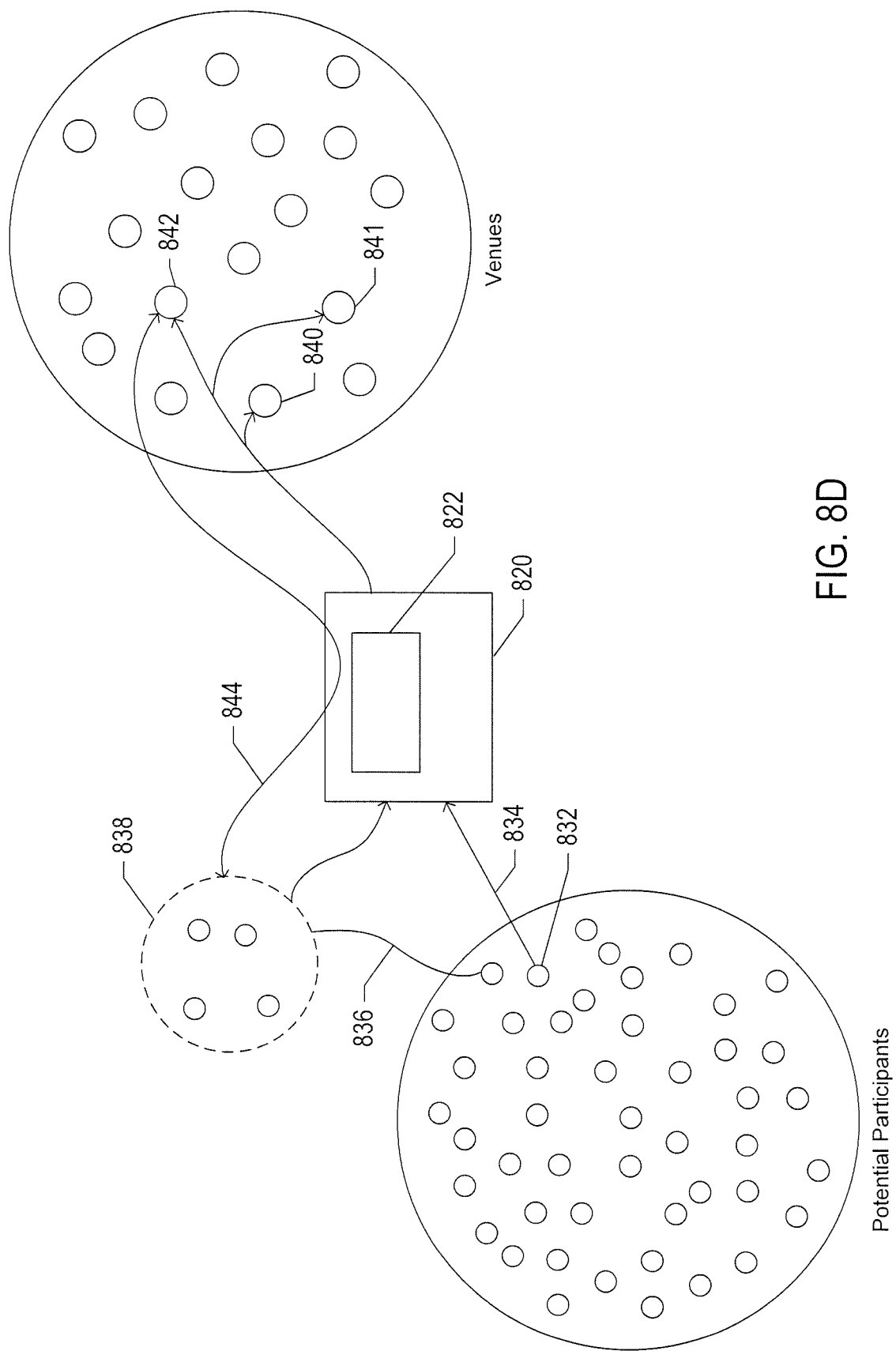

FIG. 8D illustrates a group matching operation. In this case, a potential participant 832 requests recommendations 834 from the automated concierge service 820 and additionally provides indications of additional members of a group 836. The matching functionality 822 within the automated concierge service then uses the set of attribute-value vectors for the group 838 to identify a small number of venues 840-842 that best match the set of attribute-value vectors, leading to selection of one of the recommended venues and establishment of an association between the selected venue 842 and the group, as represented by double-headed arrow 844. In this case, the automated concierge service may poll members of the group for selections. In alternative cases, the selections may be made by the initially requesting potential participant. In alternative embodiments, only the attribute values for the initially requesting potential participant may be used for matching venues, with additional potential participants added by the initially requesting potential participant following selection of a venue by the initially requesting potential participant.

FIG. 8E illustrates yet another approach to group matching. In this approach, a potential participant 850 requests recommendations for a group activity 852 as well as for selection of additional participants. The matching functionality 822 within the automated concierge service 820 then carries out an optimization method to select both the additional members for the group as well as a best matching venue. FIGS. 8A-E illustrate but a few of the many different possible types of matching services that may be provided by an automated concierge service. In certain implementations, for example, the automated concierge service may maintain schedules for potential participants and may spontaneously attempt to arrange activities on behalf of potential participants who have indicated a desire to be scheduled for upcoming group activities. Those potential participants and may additionally indicate that they wish to meet new people, wish to get to know previous acquaintances better, or be scheduled for activities with close friends. A requesting potential participant may express interest in particular types of events, venues, or services or, alternatively, may express an openness towards new types of events, venues or services.

Figure 9A:
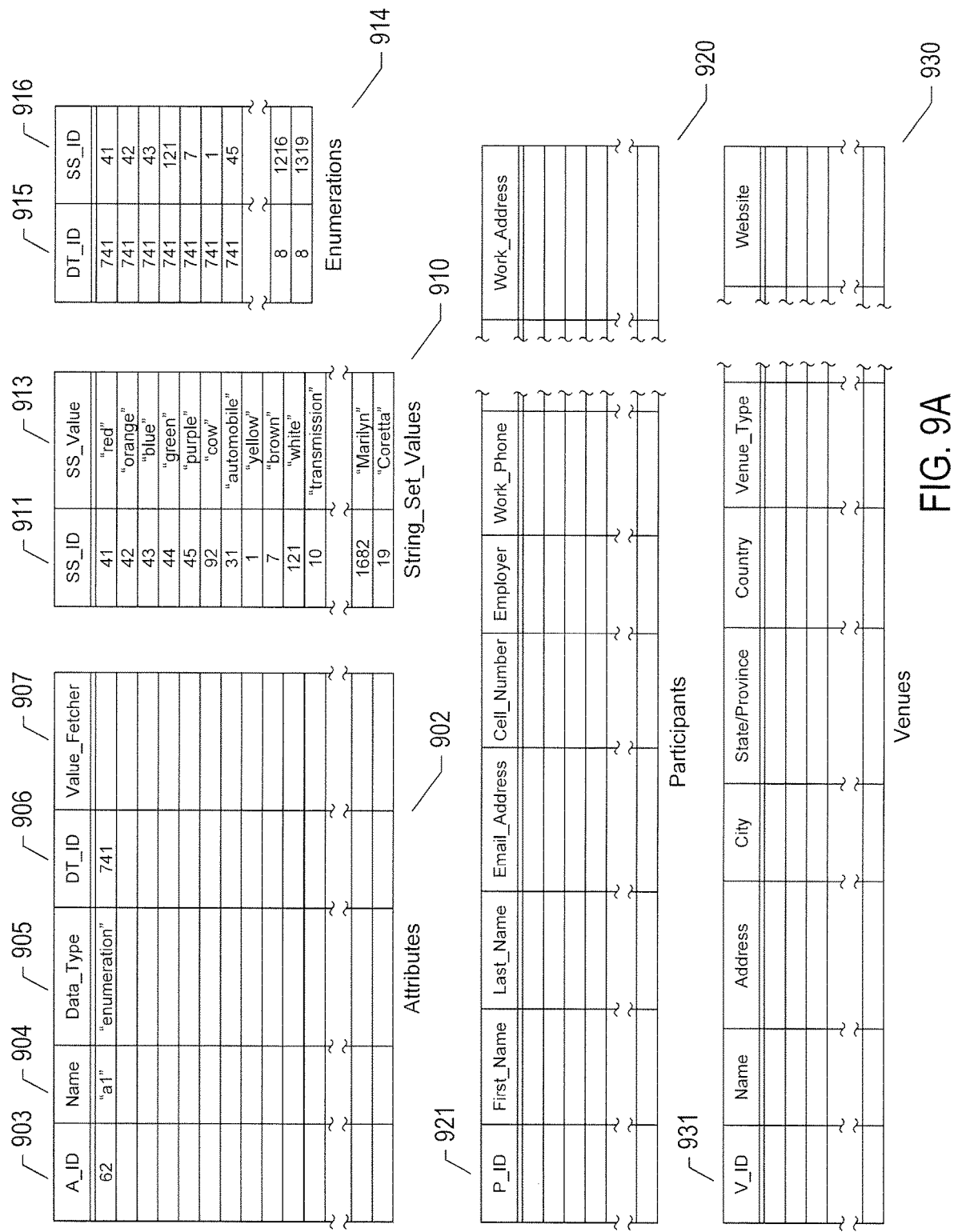
FIGS. 9A-B show numerous database tables used in one implementation of the automated concierge service.
Figure 9B:
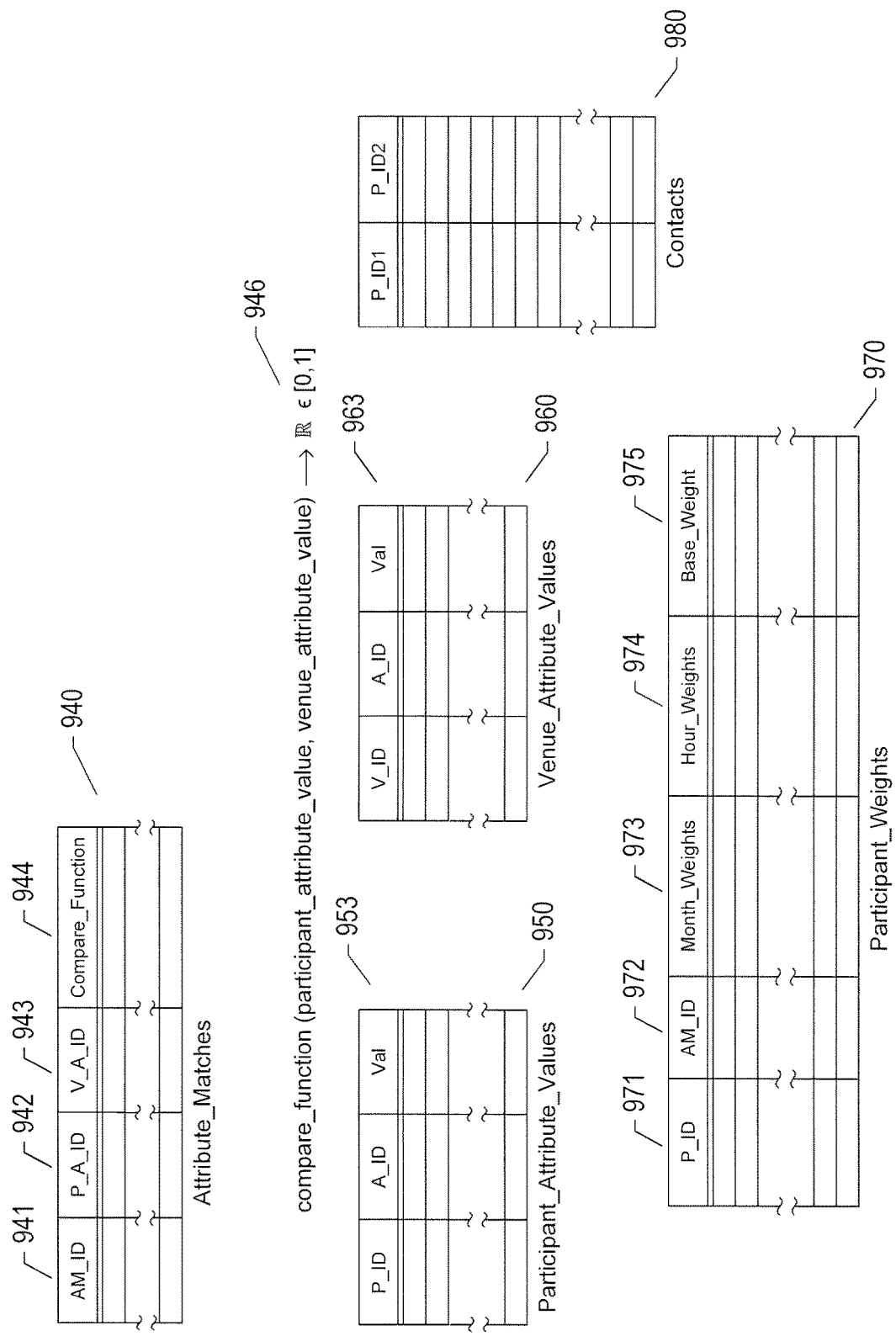

FIGS. 9A-B show numerous database tables used in one implementation of the automated concierge service. In this implementation, relational-database tables are used and the data within the tables is accessed using structured-query-language ("SQL") queries. Alternative implementations may use other types of databases, formatted files, and other types of data-storage technologies.

The table Attributes 902 in FIG. 9A stores definitions for the attributes used to characterize various entities, such as participants and venues. Each row in the table is a record that represents a different type of attribute and the columns of the table correspond to fields within attribute records. The columns in the table Attributes include: (1) A_ID 903, a numeric identifier for the attribute type; (2) Name 904, a character-string identifier for the attribute type; (3) Data_Type 905, a character string representing the name of the data type of the attribute; (4) DT_ID 906, a numeric identifier for the data type; and (5) Value_Fetcher 907, a reference to a routine or a stored procedure that is called to obtain the value for an attribute of the attribute type represented by a row in the table Attributes. As an example, the table String_Set_Values 910 contains string values that may be included in the definition of an attribute of data type enumeration. Each row in this table represents a different string value. A first column SS_ID 911 contains a numeric identifier for the string value and the second column SS Value 912 contains the string value itself. The table Enumerations 914 defines different enumerations, similar to enumerations used in the programming languages C and C++. A first column, DT_ID, 915 contains an identifier for a particular enumeration and a second column, SS_ID, 916 contains an identifier for a string value. Thus, the attribute a1, defined by the first row in the table Attributes, has a value selected from among the strings {"red," "orange," "blue," "white," "brown," "yellow," and "purple"} and thus has a value corresponding to a color. The routine or stored procedure reference in the field Value_Fetcher would contain logic to translate an integer value, such as the integer 41, into a color, such as the color red. In similar fashion, and many other different data types can be defined using additional tables. In many cases, the underlying data types provided by the database may be used directly in value fields.

The table Participants 920 and the table Venues 930 contain representations of users and venues. Each table has a first column, P_ID 921 and V_ID 931 respectively, that contain numeric identifiers for the participants in venues represented by rows in the tables Participants and Venues. The remaining columns in both tables include various information about the participants and venues, such as first and last name, email address, cell phone number, employer, work phone number, work address, street address, city, us date/Providence, country, and other such information. These columns are essentially attributes and contain attribute values, but are such common attributes that they are included in these tables rather than defined in the table Attributes. In the following discussions, these attributes are included in the attributes contained in attribute vectors for entities such as participants and venues.

Each row in the table Attribute_Matches 940 in FIG. 9B represents a potential match between a participant attribute and a venue attribute. The table Attribute_Matches includes the columns: AM_ID 941, a numeric identifier for the potential match; P_A_ID 942, the numeric identifier for a participant attribute; V_A_ID 943, the numeric identifier for a venue attribute; and Compare Function 944, a reference to a routine or stored procedure that compares the values of a participant-attribute and venue-attribute pair in order to generate a real-number comparison value in the range [0, 1], as indicated by expression 946 in FIG. 9B. The table Attribute_Matches is used during participant-to-venue matching, discussed above with reference to FIGS. 8A-E and further discussed, below. The tables Participant_Attribute_Values 950 and Venue_Attribute_Values 960 store attribute values for participants and venues. The three columns in each of these two tables represent an association between a participant or venue identifier, an attribute identifier, and an attribute value, stored in the third column Val 953 and 963 in the two tables. This value is input to the routine or stored procedure referenced by the field Value_Fetcher in the row of the table Attributes corresponding to the attribute in order to obtain the attribute value for the participant attribute or venue attribute. The table Participant_Weights 970 contains weights, or scaler factors, for each potential match for each participant that are used to compute a match score for a particular participant and a particular venue, as further discussed below. The table Participant_Weights includes the following columns: (1) P_ID 971, a numeric identifier for a participant; (2) AM_ID 972, a numeric identifier for a potential match or, in other words, for a participant-attribute/value-attribute pair considered during matching of participants to venues; (3) Month_Weights 973, a series of additional weight factors for each month of the year; (4) Hour_Weights 974, a series of additional weight factors for each hour in the day; and (5) Base_Weight 975, the primary or base weight for the participant-attribute/value-attribute pair. The values of the weights are adjusted, by machine-learning methodologies, to adjust the matching scores generated for particular participants. This is one way in which the automated concierge service learns the preferences, behavioral patterns, social relationships, and other aspects of users, or participants, over time. Other machine-learning methods are used to change the attribute values for participants, venues, and other such entities, and may carry out constrained and global optimization of both the weights and attribute values based on stored offered options and corresponding user selections. Additionally, attribute values may be obtained directly from users or by inference using information gathered from a variety of different sources, including social networks, websites, descriptions of services, venues, and events, and other such information. Continuous monitoring of these many different sources of information represent yet another facet of the automated concierge service to which machine-learning methodologies are applied. The table Contacts 980 stores contact relationships between participants. Many other such tables are used to store various different types of relationships between various different entities, including users, venues, events, and other such entities.

Figure 10A:
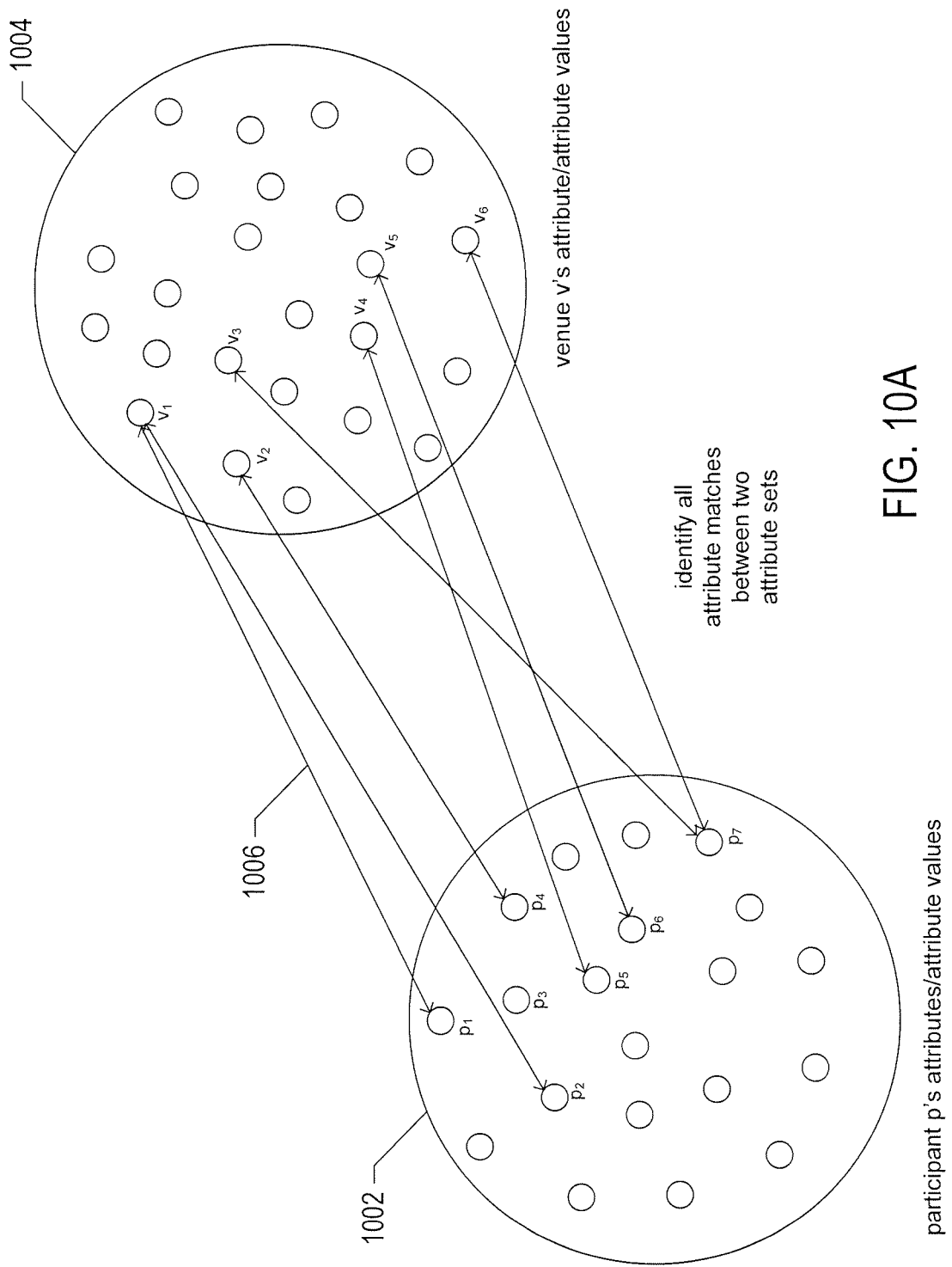
FIGS. 10A-D illustrate one implementation of the match-score-computing function that computes a match score for a participant/venue pair.
Figure 10B:
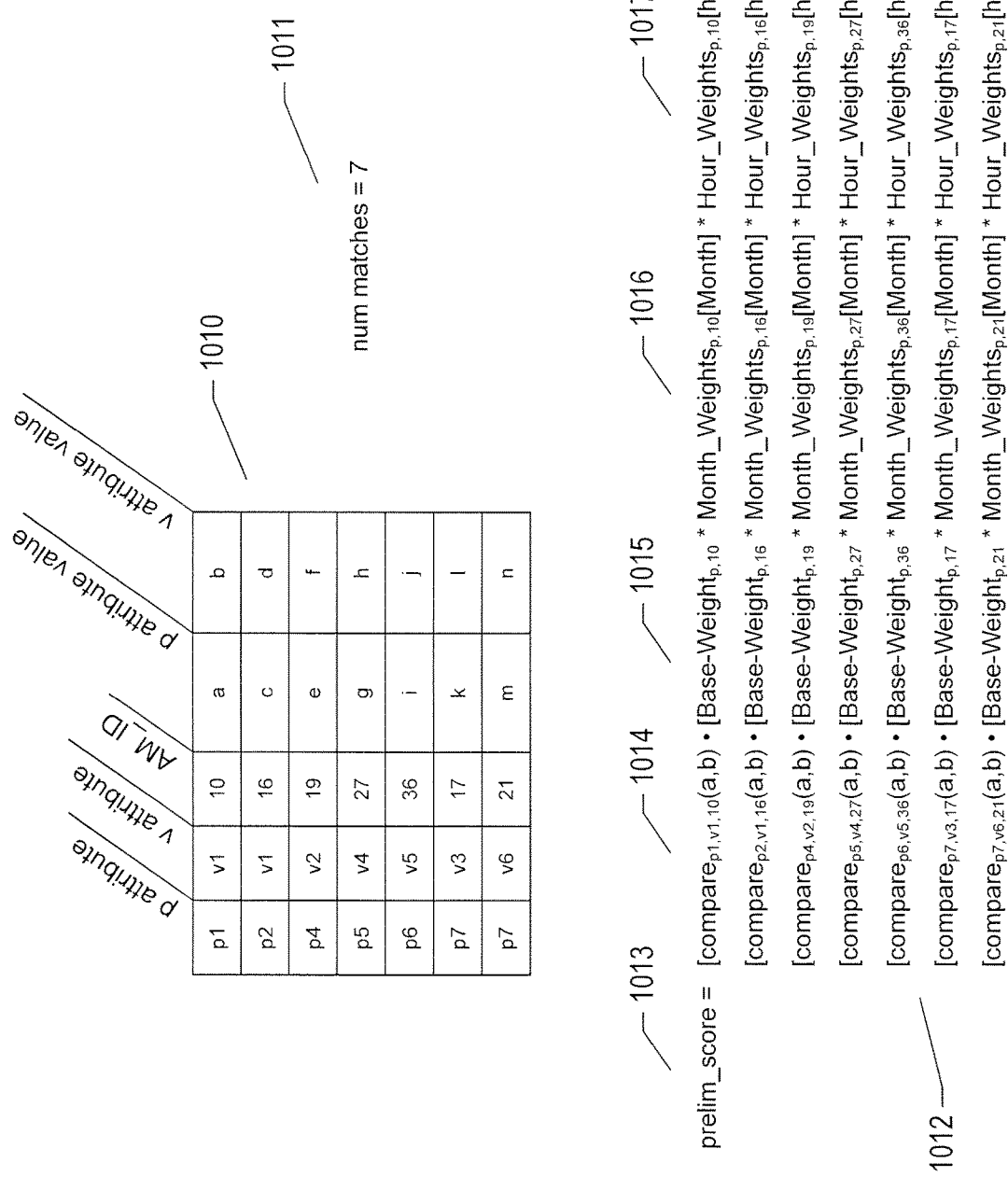
Figure 10C:
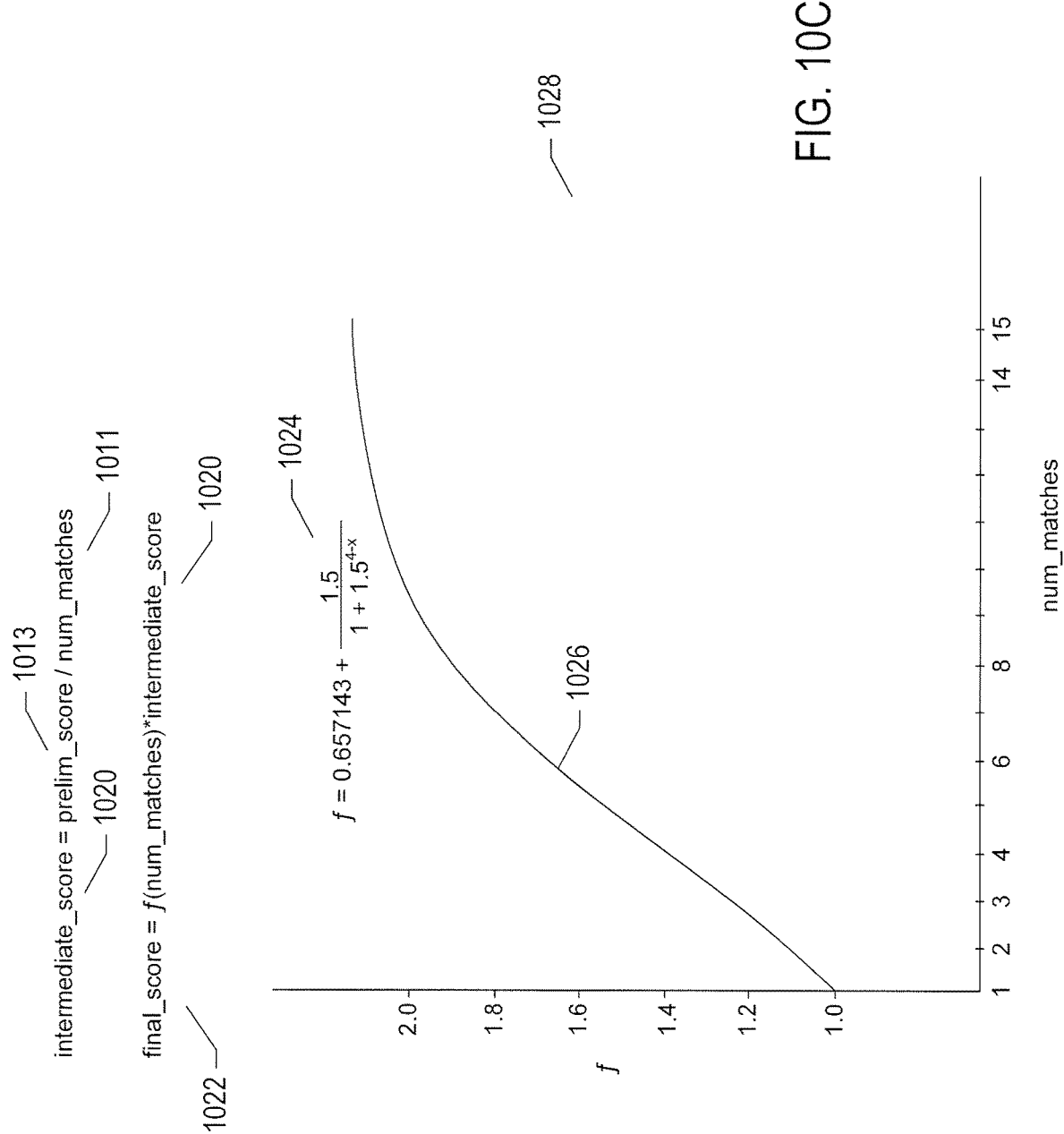

FIGS. 10A-D illustrate one implementation of the match-score-computing function that computes a match score for a participant/venue pair. As shown in FIG. 10A, a participant p is represented by a set of attribute/attribute-value pairs within a first circled area 1002 and a venue v is represented by a set of attribute/attribute-value pairs within a second circled area 1004. The above-described Attribute_Matches table (940 in FIG. 9B) is used to identify all of the potential participant-attribute/value-attribute pairs that are to be compared in order to compute a match score for the participant and venue. Not all possible attributes may be associated with values for any particular participant or venue. Thus, the Participant_Attribute_Values and Venue_Attribute_Values tables need to be used in combination with the table Attribute_Matches in order to identify all of the potential matches represented by double-headed arrows, such as double-headed arrow 1006, in FIG. 10A. The seven participant-attribute-value/venue-attribute-value pairs represented by double-headed arrows in FIG. 10A can be alternatively represented by table 1010 in FIG. 10B, with the variable num_matches 1011 set to the value 7. Thus, for example, the first row in this table represents the participant-attribute-value/venue-attribute-value pair p1/v1 represented by double-headed arrow 1006. The attribute values are represented by single-character symbols in the final two columns of table 1010 and the match identifier for each participant-attribute-value/venue-attribute-value pair, which identifies a row in the table Attribute_Matches, is stored in the third column of table 1010. As shown in the expression 1012 in the lower portion of FIG. 10B, a preliminary score 1013 is computed from the attribute values and other information in table 1010. A term is computed for each participant-attribute-value/venue-attribute-value pair, for the first pair shown by the first line of the seven-line expression 1012, as the product of the return value of the comparison function referenced for the pair in the final column of the table Attribute_Matches 1014, the base weight for the pair 1015, a month weight 1016, and an hour wait 1017. Thus, the value returned by the comparison function is multiplied by participant-specific weights. The factors are some to generate the preliminary score. Then, as shown in FIG. 10C, an intermediate score 1020 is computed by dividing the preliminary score 1013 by the value stored in the variable num_matches 1011. The intermediate score is essentially an average of the values of the terms computed for all of the participant-attribute-value/venue-attribute-value pairs. Then, a final score 1022 is computed by multiplying the intermediate score 1020 by the value of a function $f(\ )$, which takes the value stored in the variable num_matches as an argument. In one implementation, this function is obtained by the expression 1024 plotted as curve 1026 in plot 1028 in the lower portion of FIG. 10C. The function $f(\ )$ increases the final score according to the number of participant-attribute-value/venue-attribute-value-pair factors that are summed to produce the preliminary score. The increase, however, is not linear, but is instead sigmoidal in nature, with almost no additional weight added for more than a threshold number of additional factors.

Figure 10D:
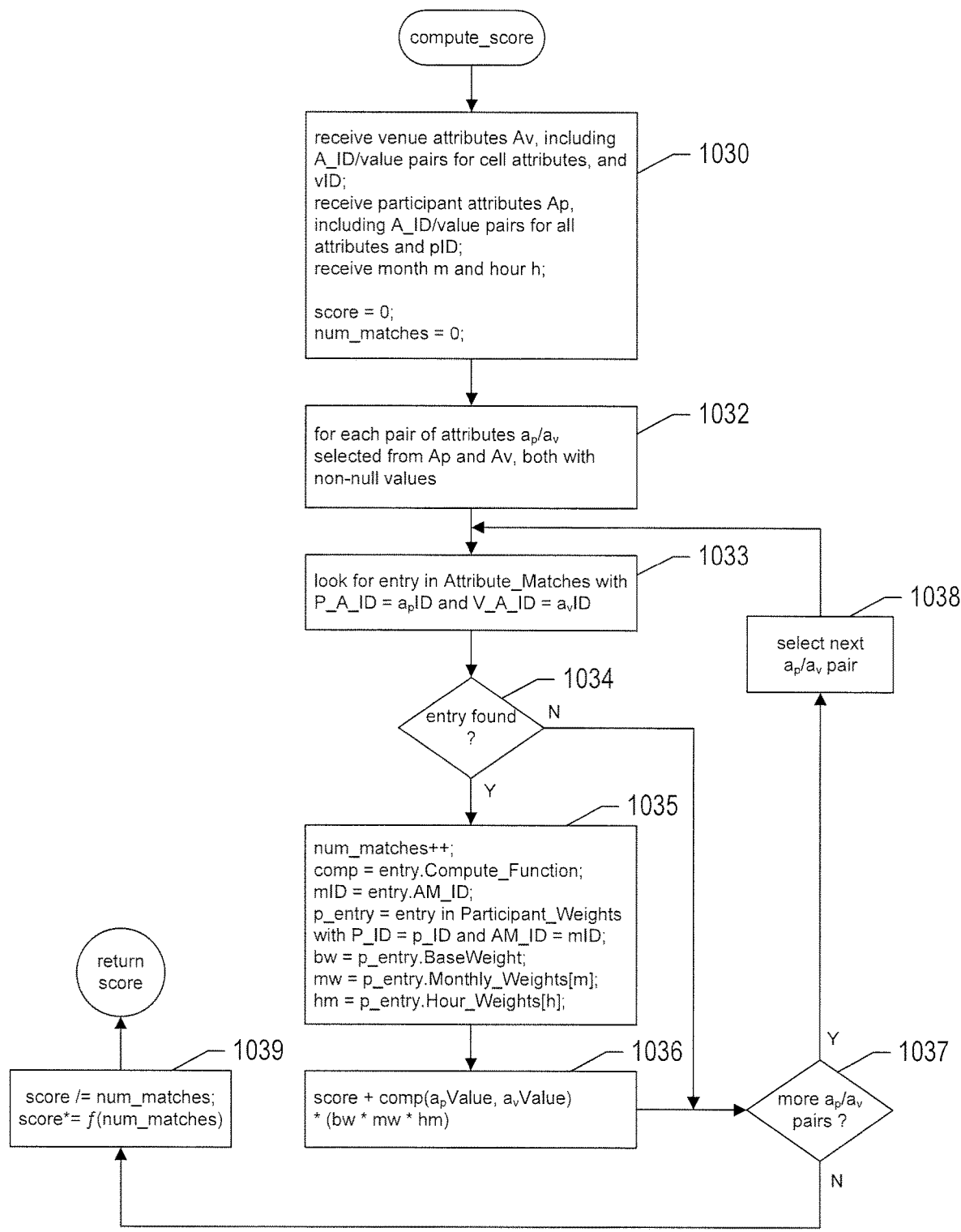

FIG. 10D provides a control-flow diagram for a routine compute_score that carries out the score computation discussed above with reference to FIGS. 10A-C. In step 1030, the routine compute_score receives the attribute vectors and identifiers for a participant p and a venue v. Variables score and num_matches are both set to 0. Then, in the for-loop of steps 1032-1039, each participant-attribute-value/venue-attribute-value pair with both values in the pair non-null, is considered. In step 1033, the routine compute_score looks for an entry in the table Attribute_Matches for the currently considered participant-attribute-value/venue-attribute-value pair. When an entry is found, as determined in step 1034, then, in step 1035, the variable num_matches is incremented and the various values and references needed to compute the preliminary score, discussed above with reference to FIG. 10B are collected from the database tables. In step 1036, the preliminary score is incremented by the computed term for the currently considered participant-attribute-value/venue-attribute-value pair. In step 1037, the routine compute_score determines whether there are more participant-attribute-value/venue-attribute-value pairs to consider. If so, then the next pair is selected, in step 1038, and control returns to step 1033 for another iteration of the for-loop of steps 1033-1039. Otherwise, control flows to step 1039, where the final score is computed by dividing the preliminary score by the value stored in variable num_matches to generate the intermediate score, and the intermediate score is multiplied by a value returned by the function $f(\ )$ to generate the final score. When no entry is found in the table Attribute_Matches, as determined in step 1034, control flows to step 1037 without computing a term.

Figure 11A:
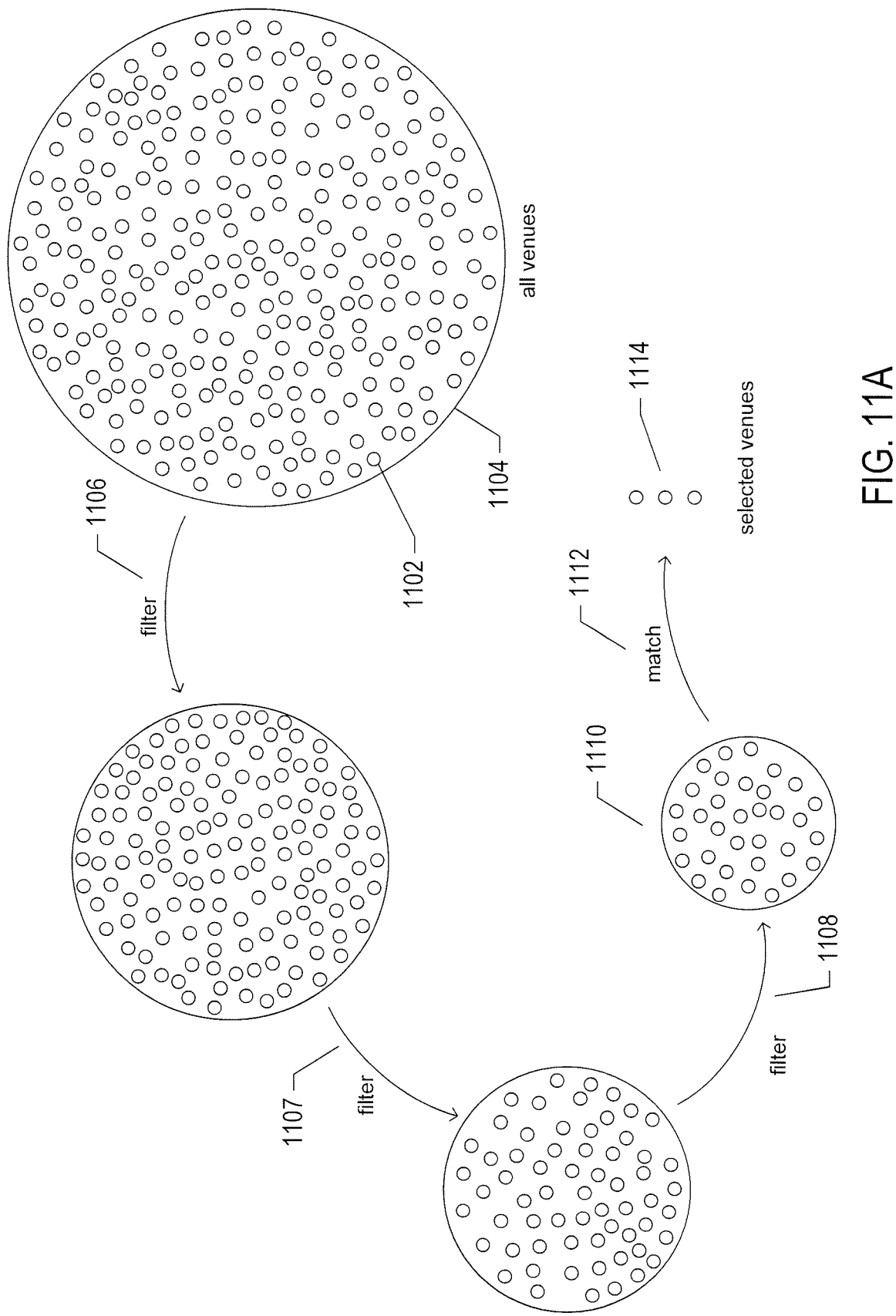
FIGS. 11A-B illustrate a method by which the automated concierge service finds matching venues for a particular user, as initially discussed above with reference to FIGS. 8A-E.
Figure 11B:
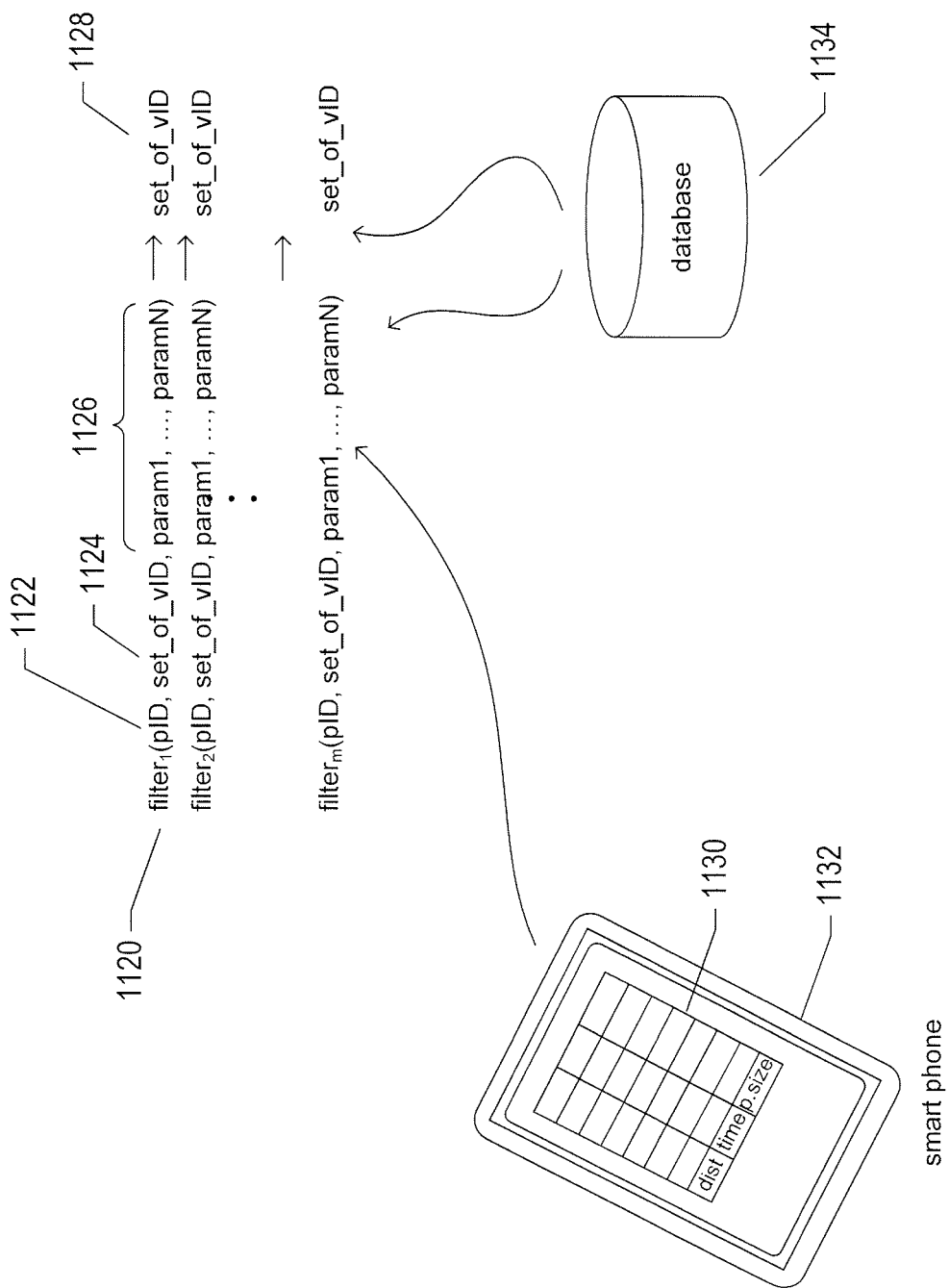

FIGS. 11A-B illustrate a method by which the automated concierge service finds matching venues for a particular user, as initially discussed above with reference to FIGS. 8A-E. In FIG. 11A, all of the venues known to the automated concierge service are represented by small disks, such as disk 1102, within the large circled area 1104. In a series of filter steps, represented by arrows 1106-1108, the automated concierge service successively applies filters to the full set of venues in order to generate a generally much smaller set of candidate values 1110. The filters may be logic expressions which return Boolean values, such as "20:00<= v.start_time<=21:00," which returns a value TRUE when the start time for an event at a venue v it is between 8:00 and 9:00 PM. Of course, there are many different possible filters that may be used depending on the type of events, venues, or services to which a user is being matched. In a final step 1112, the automated concierge service computes a score, as discussed above with reference to FIGS. 10A-D, for each candidate venue in the set 1110. The venues with the highest computed scores are then selected 1114 for recommendation to the user. As shown in FIG. 11B, in one implementation, the filter steps may be represented by filter functions, such as a filter function 1120, which take, as arguments, an identifier for a user 1122, a set of venue identifiers 1124, and one or more parameters 1126 and return a generally smaller set of venue identifiers 1128. The parameters may be, using the above example, times of day representing a range of times desired for the start of the event by a user, but many other types of parameters may be used by the automated concierge service. As indicated in FIG. 11B, the values of these parameters may be obtained from a user via a user interface displayed to the user 1130 on a user's device 1132, but may also be obtained from the database 1134 and/or from additional sources of parameter values.

Figure 12A:
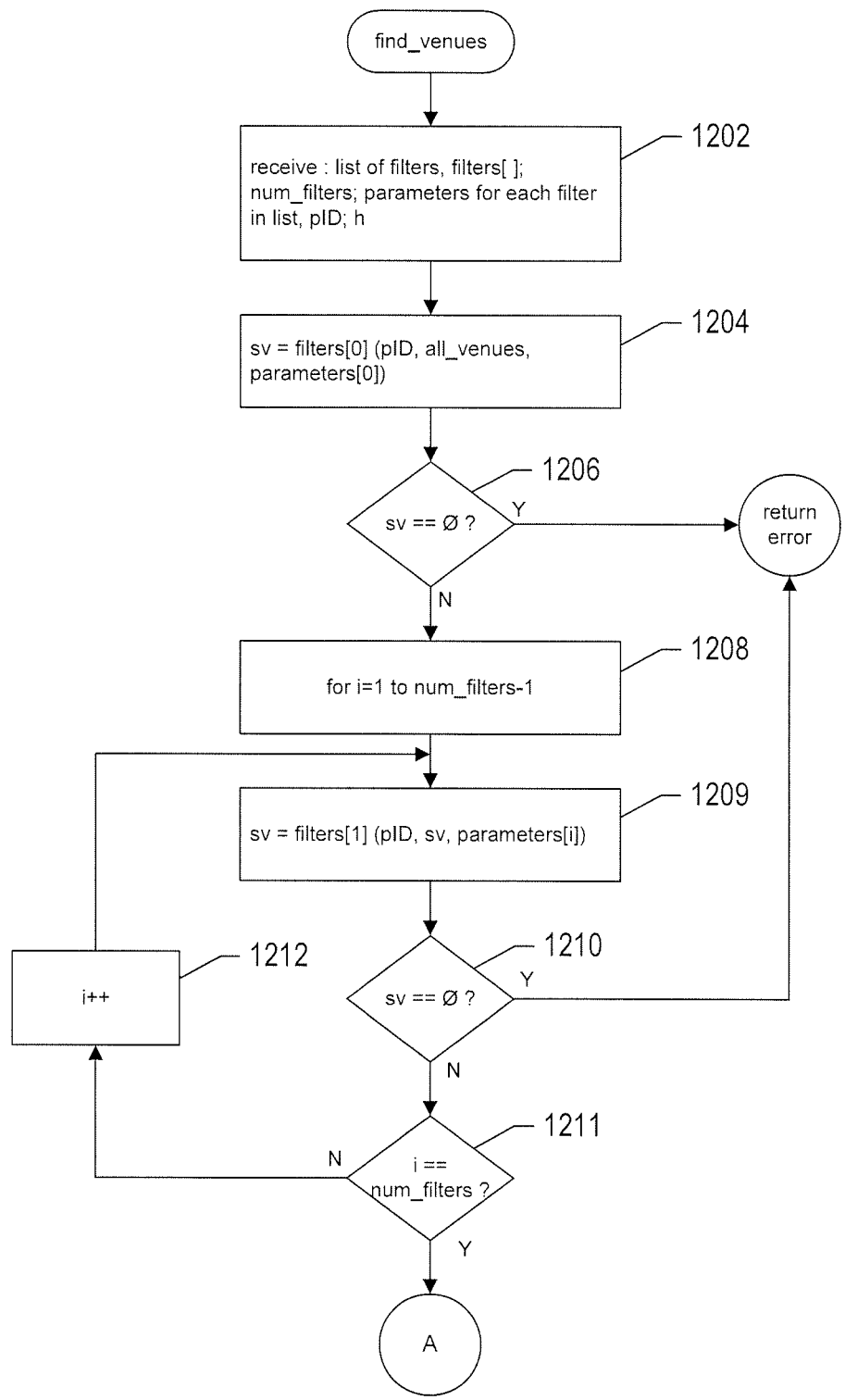
FIGS. 12A-C provide control-flow diagrams that illustrate the method by which the automated concierge service finds matching venues for a particular user, discussed above with reference to FIGS. 11A-B.
Figure 12B:
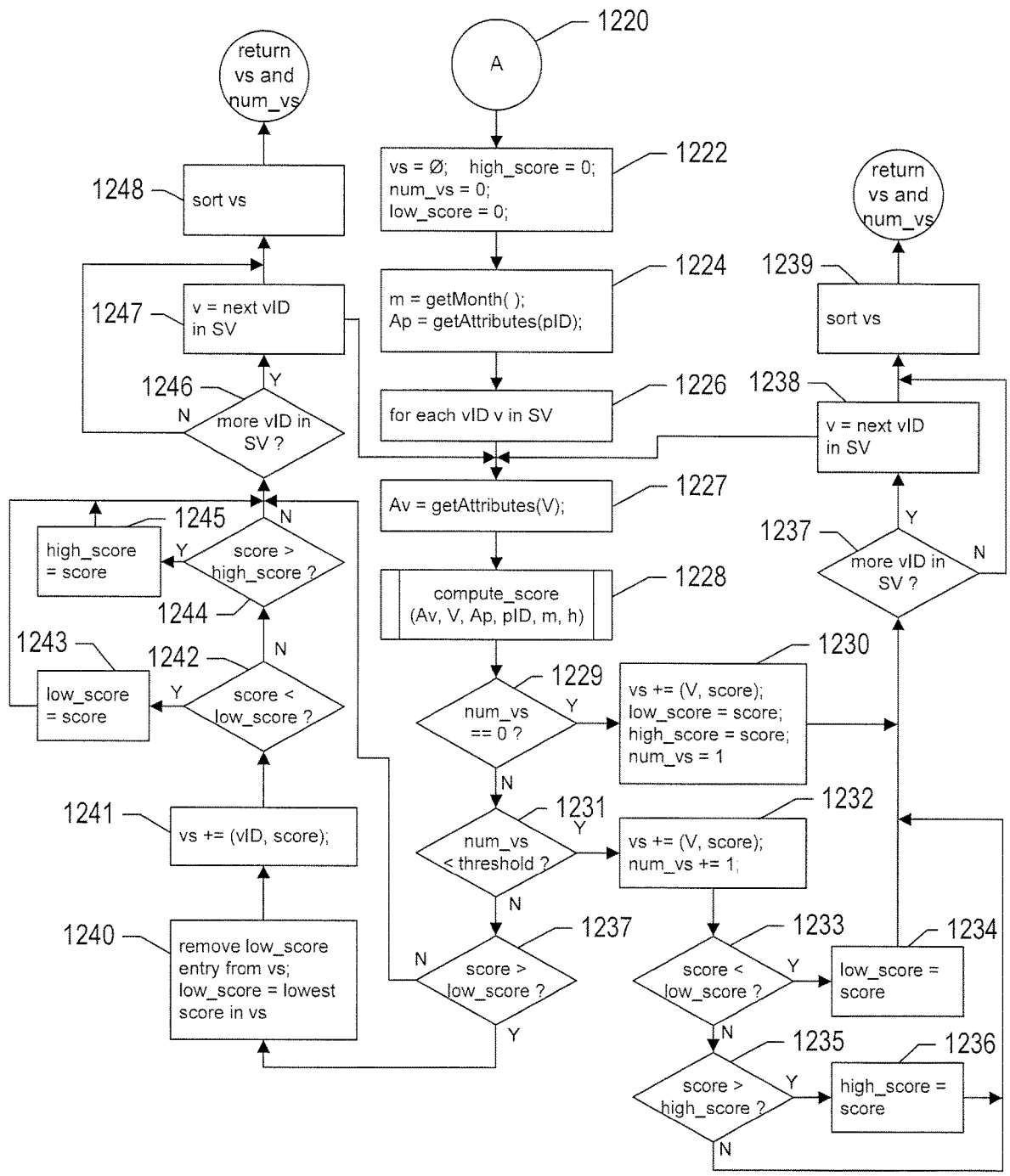
Figure 12C:
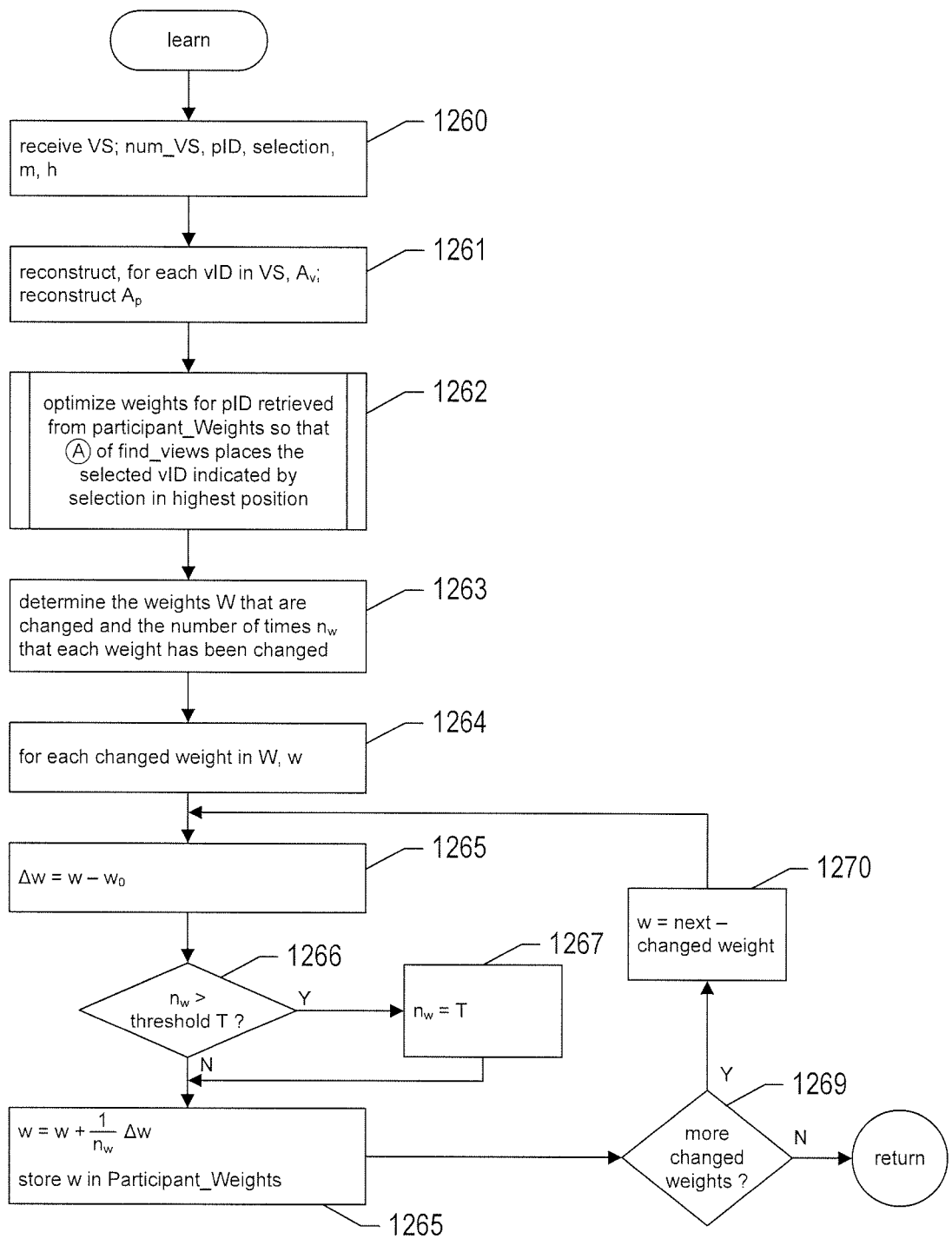

FIGS. 12A-C provide control-flow diagrams that illustrate the method by which the automated concierge service finds matching venues for a particular user, discussed above with reference to FIGS. 11A-B. FIGS. 12A-B provide a control-flow diagram for a routine find_venues. In step 1202, the routine find_venues receives a list of filters, filters[ ], an indication of the number of filters in the list, num_filters, parameters for each filter in the list, an identifier for a user pID, and an indication of the hour, h. In step 1204, the routine find_venues applies the first filter in the list to all of the venues known to the automated concierge service in order to generate a first set of candidate venues sv. When sv it is not an empty set, as determined in step 1206, then, in the for-loop of steps 1208-1212, the routine find_venues successively applies the remaining filters to the set of candidate venues sv in order to generate a final set of candidate venues (1110 in FIG. 11A). Control flows to point 1220 in FIG. 12B. In step 1222, the routine find_venues variables vs, num_vs, low_score, and high_score to 0 or the empty set. The variable vs is a set that will contain the venues selected for recommendation to the user. In step 1224, the routine find_venues sets the variable in the current month and sets the attribute-vector variable $A_p$ to the values for the attributes for the user identified by the identifier pID. Then, in the for-loop of steps 1226-1248, each venue in the set of candidate venues is scored and the candidate venues with the top scores are returned, as discussed above with reference to FIG. 11A. In step 1227, the routine find_venues obtains the attribute vector $A_v$ for the currently considered venue. In step 1228, the routine find_venues computes a match score for the venue with respect to the user or participant. When there are no already selected venues, as determined in step 1229, the currently considered venue, along with the match score, is entered into the set vs and the local variables low_score, high_score, and num_vs are updated, in step 1230. Otherwise, when the number of selected venues is less than a threshold value, as determined in step 1231, the currently considered venue, along with the match score, is entered into the set vs and the local variable num_vs is updated, in step 1232. When the match score computed for the currently considered venue is less than low_score, as determined in step 1233, the local variable low_score is accordingly updated, in step 1234. Otherwise, when the match score computed for the currently considered venue is greater than high_score, as determined in step 1235, the local variable high_score is accordingly updated, in step 1236. Then, following any of steps 1230, 1234, and 1236, when there are additional venues in the candidate venues set, as determined in step 1237, a next event is selected, in step 1238, in preparation for another iteration of the for-loop of steps 1226-1248 and control returns to step 1227. Otherwise, in step 1239, the set of venues vs is sorted and then returned, following which the automated concierge service offers these venues in a recommendation to the user or participant. When there are already a threshold number of venues in the set vs, as determined in step 1231, the routine find_venues determines whether the computed match score is greater than low_score, in step 1237. If so, then, in step 1240, the routine find_venues removes the venue with the lowest score from the set vs, in step 1240, and updates low_score. In step 1241, the routine find_venues as the currently considered venue and match score to the set vs. When the match score is less than low_score, as determined in step 1242, low_score is accordingly updated, in step 1243. Otherwise, when the match score is greater than high_score, as determined in step 1244, high_score is accordingly updated, in step 1245. When there are more candidate venues to consider, as determined in step 1246, the next candidate venue is selected for a subsequent iteration of the for-loop of steps 1226-1248, in step 1247, and control returns to step 1227. Otherwise, the set of venues is sorted, in step 1248, and then returned, following which the automated concierge service offers these venues in a recommendation to the user or participant. Of course, additional error detection and error handling logic would be included in an actual implementation.

FIG. 12C provides a control-flow diagram for a routine learn, which represents one of many different machine-learning techniques used by the currently disclosed automated concierge service. In step 1260, the routine learn receives a set of venue selections vs, a variable num_vs that indicates the number of venue selections, an identifier for the participant, pID, an indication of the venue selected from among the venue selections in vs by the participant, selection, and the month in and hour h. In step 1261, the routine learn determines the attribute vectors for the participant, $A_p$, and for each venue in vs, $A_v$. In step 1262, the routine learn optimizes the weights for the attributes of the participant so that, when the logic shown in FIG. 12B is run to score the candidate venues, the venue selected by the participant is assigned the greatest matching score. In step 1263, the routine learn determines the set of weights W for which the values are changed by the optimization step and also determines, from historical data, the number of times $n_w$ each of these weights has been changed. Then, in the for-loop of steps 1264-1270, each of the changed weights of the set of weights w is updated. In step 1265, the change for the currently considered weight w, $\Delta w$, is computed as the difference between the changed weight and the original weight value currently stored in the database, $w_o$. When $n_w$ is greater than a threshold value T, as determined in step 1266, $n_w$ is set to T in step 1267. In step 1268, a new value for the currently considered weight w is computed as the sum of the current value for the weight w plus the above-computed difference Δw discounted by the ratio $1/n_w$. Thus, the weights associated with the participant altered by the optimization process in step 1262 are adjusted, but the adjustments are discounted with respect to the number of times the particular weight has been adjusted in the past. This allows the participant weights to approach convergence, but continued to be adjusted in order to reflect changes in participants' behaviors and preferences. When there are more weights in W to consider, as determined in step 1269, a next weight w is selected, in step 1270, for a next iteration of the for-loop of steps 1264-1270. Otherwise, the routine learn returns. The routine learn may be called by the automated concierge service after each selection from a displayed set of recommendations is made by the user. Alternatively, the automated concierge service may less frequently employ the routine learn. As mentioned above, this is only one example of many different applications of machine-learning technologies to continuously adapt the automated concierge service to the ever-changing behaviors and preferences of users.

Figure 13A:
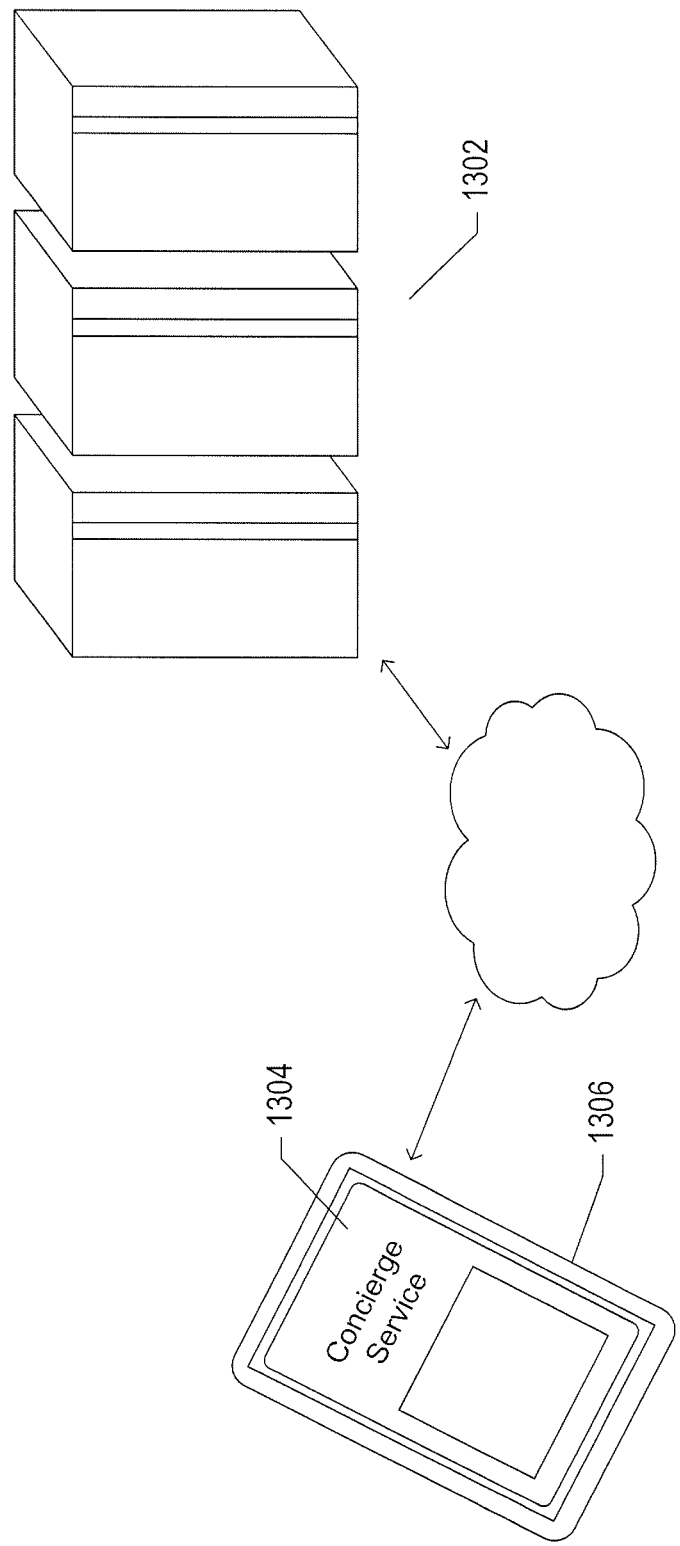
FIGS. 13A-C illustrate an overall implementation architecture of one implementation of the currently disclosed automated concierge service.
Figure 13B:
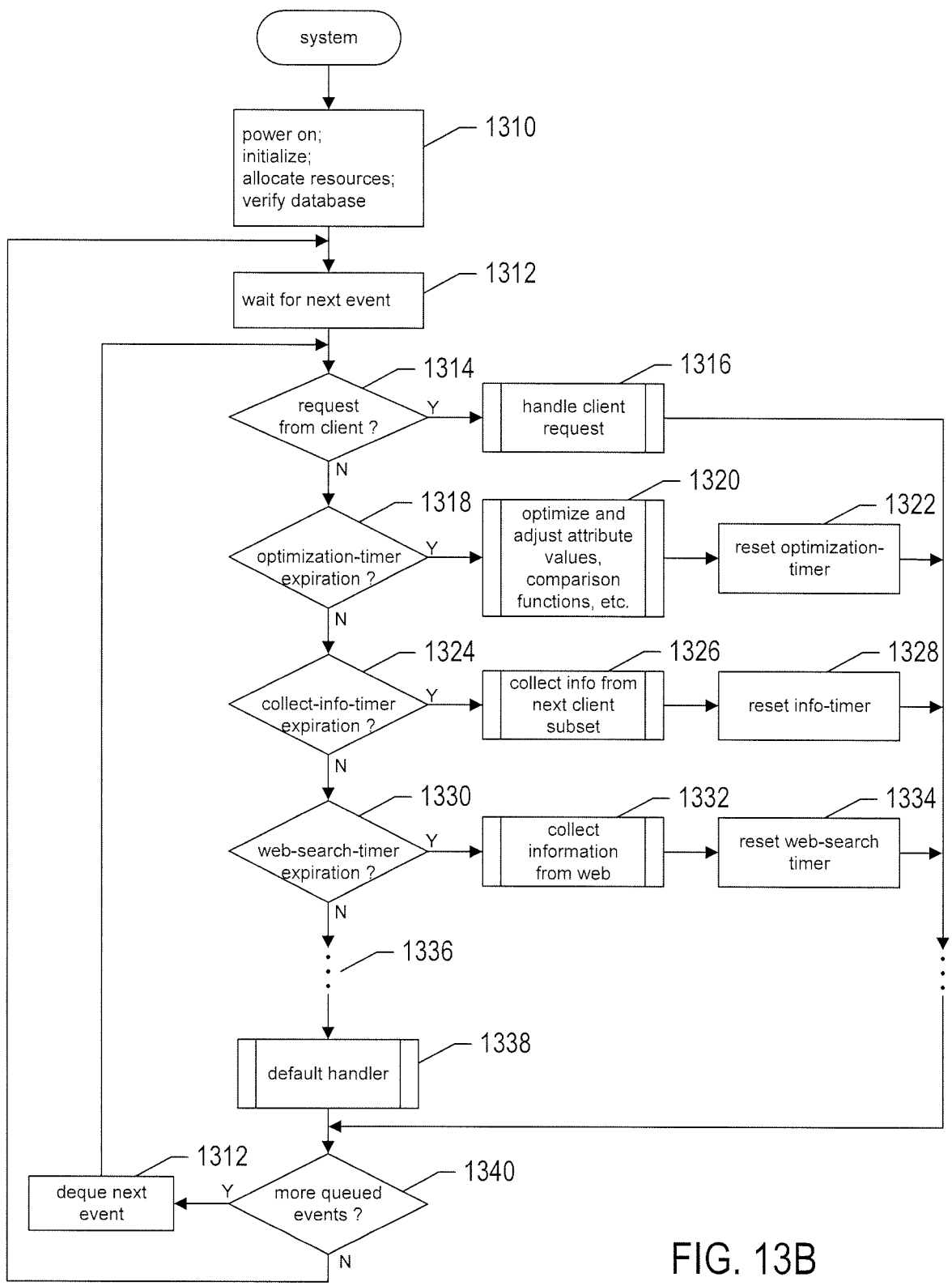
Figure 13C:
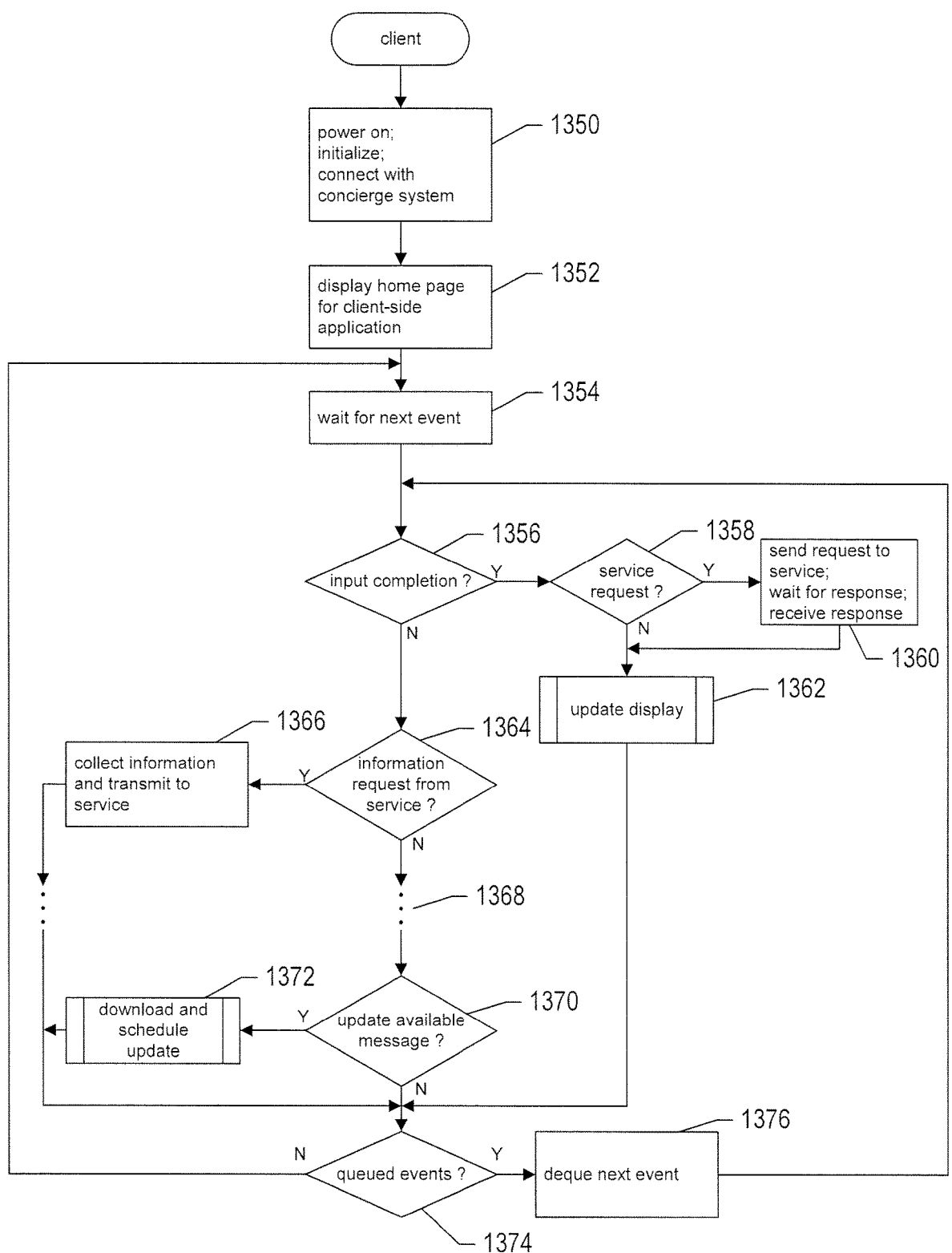

FIGS. 13A-C illustrate an overall implementation architecture of one implementation of the currently disclosed automated concierge service. As shown in FIG. 13A, the automated concierge service is implemented as a cloud service within the cloud-computing facility 1302 and as client-side applications 1304 downloaded to client devices, such as smart phones 1306. The client-side applications are responsible for displaying the automated-concierge-service user interface and for handling immediate interactions with users. The client-side applications communicate with the cloud service in order to make requests, receive responses, and provide the cloud service with information needed to continuously learn the behaviors, preferences, and other characteristics of users.

FIG. 13B shows a control-flow diagram illustrating an event loop that represents the foundation of one implementation of the cloud service. In step 1310, the cloud service is powered on, and initializes itself, allocates various computational resources needed for operation, and verifies connection to the database used to store user information and other information needed by the automated concierge service. Then, in step 1312, the cloud service waits for a next event to occur. When the next event is a request from a client-side application, as determined in step 1314, a request handler is called, in step 1316, to handle the request. When the event is an optimization-timer expiration, as determined in step 1318, then an optimization routine is called, in step 1320, to optimize and adjust attribute values, comparison functions, and other such entities in order to incrementally learn from the most recent recommendation selections, user feedback, and other historical information related to operation of the automated concierge service. Following optimization, the optimization timer is reset, in step 1322. When the event is a collect-information-timer expiration, as determined in step 1324, a routine is called, in step 1326, to initiate collection of additional information from a subset of the clients, or users, by various means and the information-collection timer is reset in step 1328. When the next event is a web-search timer expiration, as determined in step 1330, then a routine is called, in step 1332, to collect information from the web with respect to events, venues, services, and other information used by the automated concierge service for providing recommendations and facilitating acceptance of those recommendations by users, after which the web-search timer is reset in step 1334. Ellipses 1336 indicate that many other types of events may be handled by the cloud service. A default handler 1338 handles rare or none expected events.

When there are more events queued for handling, as determined in step 1340, a next event is dequeued in step 1342 and control returns to step 1314. Otherwise, control returns to step 1312, or the cloud service waits for a next event to occur. Of course, the cloud service may be implemented by many different cloud-service-application instances running on many different servers within a cloud-computing facility. Each of these instances would have their own underlying event loops and implementations. The event loop shown in FIG. 13B is intended as an illustration of the overall implementation strategy for the cloud service. In general, the cloud service continuously handles client requests, continuously adjust and optimizes attribute values, comparison functions, weights, and other such computational entities in order to continuously learn how to better assist the participants and in order to continuously learn about new events, venues, and services that can be offered to participants.

FIG. 13C provides a control-flow diagram that illustrates operation of the client-side applications. This control-flow diagram also illustrates an event loop, similar to the event loop discussed above with reference to FIG. 13B. In step 1350, the client-side application is powered on and initialized, and the establishes connections with the automated concierge system. In step 1352, the client-side application displays a home page of the client-side-application-provided user interface. Then, in step 1354, the client-side application waits for a next event to occur. When the next event is completion of input of an input value to the user interface, as determined in step in step 1356, and when the input completion is associated with a request made to the cloud service, as determined in step 1358, the client-side application sends the requests to the cloud service, in step 1360, and waits for a response to be received. Following the response, or when the input completion is not associated with a service request, the user interface is updated, in step 1362. When the event is an information request from the cloud service, as determined in step 1364, the client-side application collects the information and returns it to the service, in step 1366. Ellipses 1368 indicate that many other types of events are handled by the client-side application. When the event is a notification of an available update, as determined in step 1370, the client-side application downloads the update and schedules for the update to be applied, in step 1372. When there are more events queued for handling, as determined in step 1374, a next, event is a dequeued, in step 1376, control returns to step 1356. Otherwise, control returns to step 1354, where the client-side application waits for a next event to occur.

Figure 14:
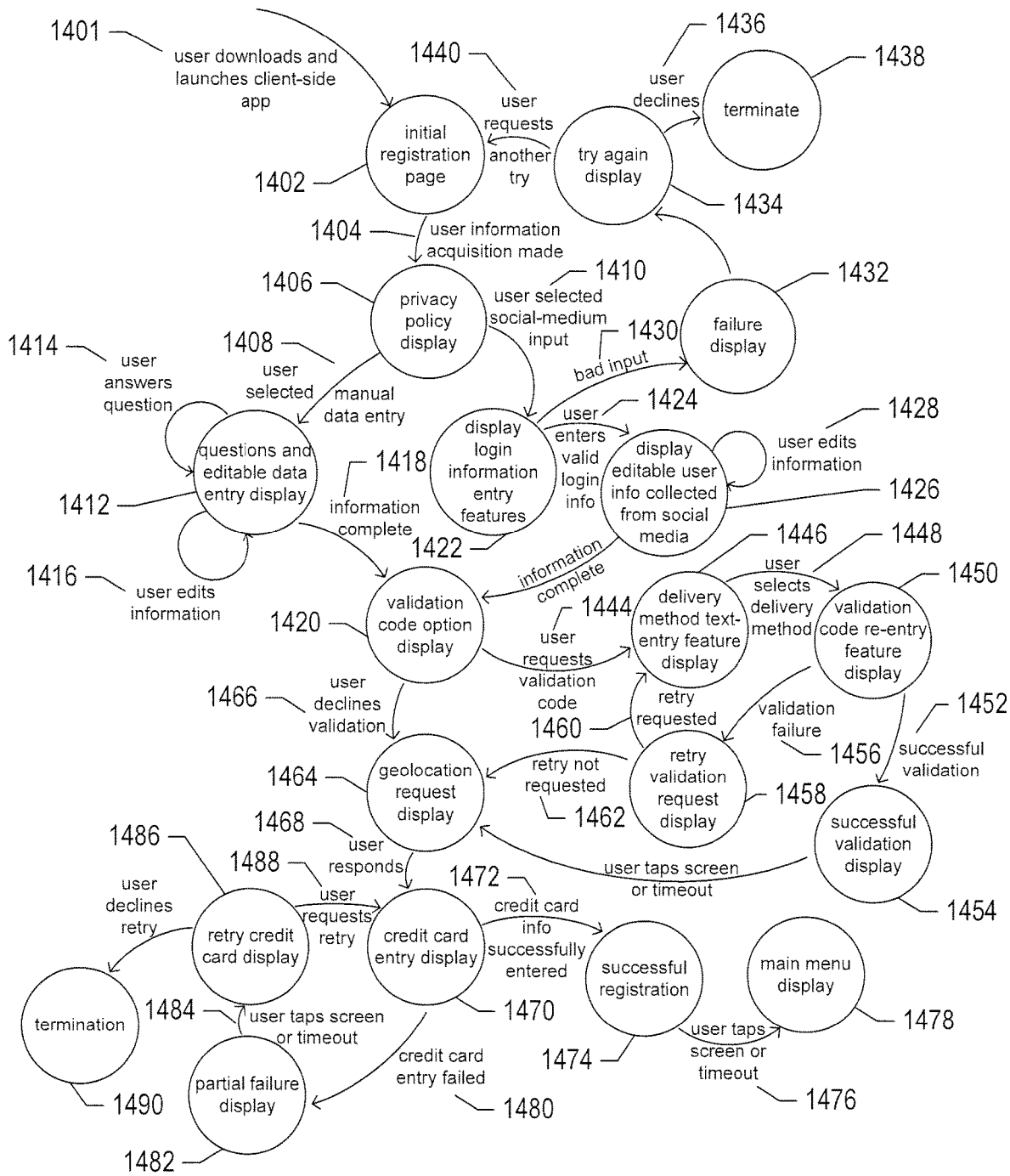
FIG. 14 provides a state-transition diagram that illustrates the user-registration process provided by one implementation of the currently disclosed automated concierge service.

FIG. 14 provides a state-transition diagram that illustrates the user-registration process provided by one implementation of the currently disclosed automated concierge service. The state-transition diagram comprises a number of states, represented by disks, such as disk 1402, and transitions between states, generally associated with some type of event or action, represented by curved arrows, such as curved arrow 1404. Following downloading and launching of the client-side application by a user 1401, the client-side application displays an initial registration page 1402. The initial registration page provides several options for information collection by the automated concierge service. When the user selects one of the options 1404, a privacy policy is displayed 1406 and then the client-side application transitions either to manual data entry 1408 or to social-network-based information collection 1410. During manual data entry, the client-side application displays questions and an editable data-entry page 1412, with the user able to answer questions 1414 and edit the displayed information 1416.

When the information is complete 1418, the client-side application transitions to display an invalidation-code option 1420. When the user has selected social-medium-based information collection, the client-side application displays a login-information-collection entry feature 1422. When the user enters the requested login information 1424 the client-side application displays information collected from social media in an editable form 1426 which the user may repeatedly edit until the information meets the user's acceptance criteria 1428. However, when the user fails to input correct login information 1430, the client-side application displays a failure indication 1432 and then a try-again request 1434. A user may decline the tri-again request 1436, at which point the client-side application terminates 1438. When the user accepts the try-again request 1440, the client-side application transitions back to display of the initial registration page 1402. There may be many additional failure-detection, failure-indication-display, and accompanying state transitions not shown in FIG. 14, and such error detection and handling it is also omitted from the state-transition diagram shown in FIG. 15, for sake of clarity. When the user requests a validation code 1444, the client-side application displays a request for a target device and delivery method 1446. When the user selects a device and delivery method 1448, the client-side application transmits information to the cloud service, which sends a validation code to the user device by the selected delivery method, after which the client-side application displays a validation-code reenter request 1450. When the user enters the validation code received by the selected delivery method 1452, the client-side application displays an indication of successful validation 1454. However, when the user fails to properly enter the validation code 1456, the client-side application displays a validation-retry request 1458. When the user indicates a desire to retry the validation 1460, the client-side application transitions back to state 1446. Otherwise, when the user fails to request to retry 1462, the client-side application displays a geolocation request 1464, which requests that the user allow the geolocation through the user's smart phone. The state is also reached when the user to clients of the validation-code option 1466 when the user responds to the geolocation request 1468 the client-side application displays a credit-card entry form 1470. When the user successfully supplies the requested credit-card information 1472, an indication of successful registration is displayed by the client-side application 1474 and, following input by the user 1476, the client-side application displays a main menu 1478. When the user fails to properly enter credit-card information 1480, the client-side application indicates partial registration failure 1482. Following user input 1484, the client-side application requests credit-card-entry retry 1486. When the user requests retry 1488, the client-side application transitions back to state 1470. Otherwise, the client-side application terminates without completing registration in state 1490. Thus, in order to successfully register with the automated concierge service, in the disclosed implementation, the user needs to download and launch the client-side application, provide initial information to the automated concierge service so that the automated concierge service can provide reasonable recommendations and facilitate acceptance of those recommendations by the user, may provide a validation code on request, requests that the user allow the automated concierge service to monitor the user's location through geolocation services provided by the user's smart phone, and collects information for at least one credit card to allow the automated concierge service to automatically bill the user for tickets, reservations, payments for services, and other such costs associated with the concierge services provided by the automated concierge service.

Figure 15:
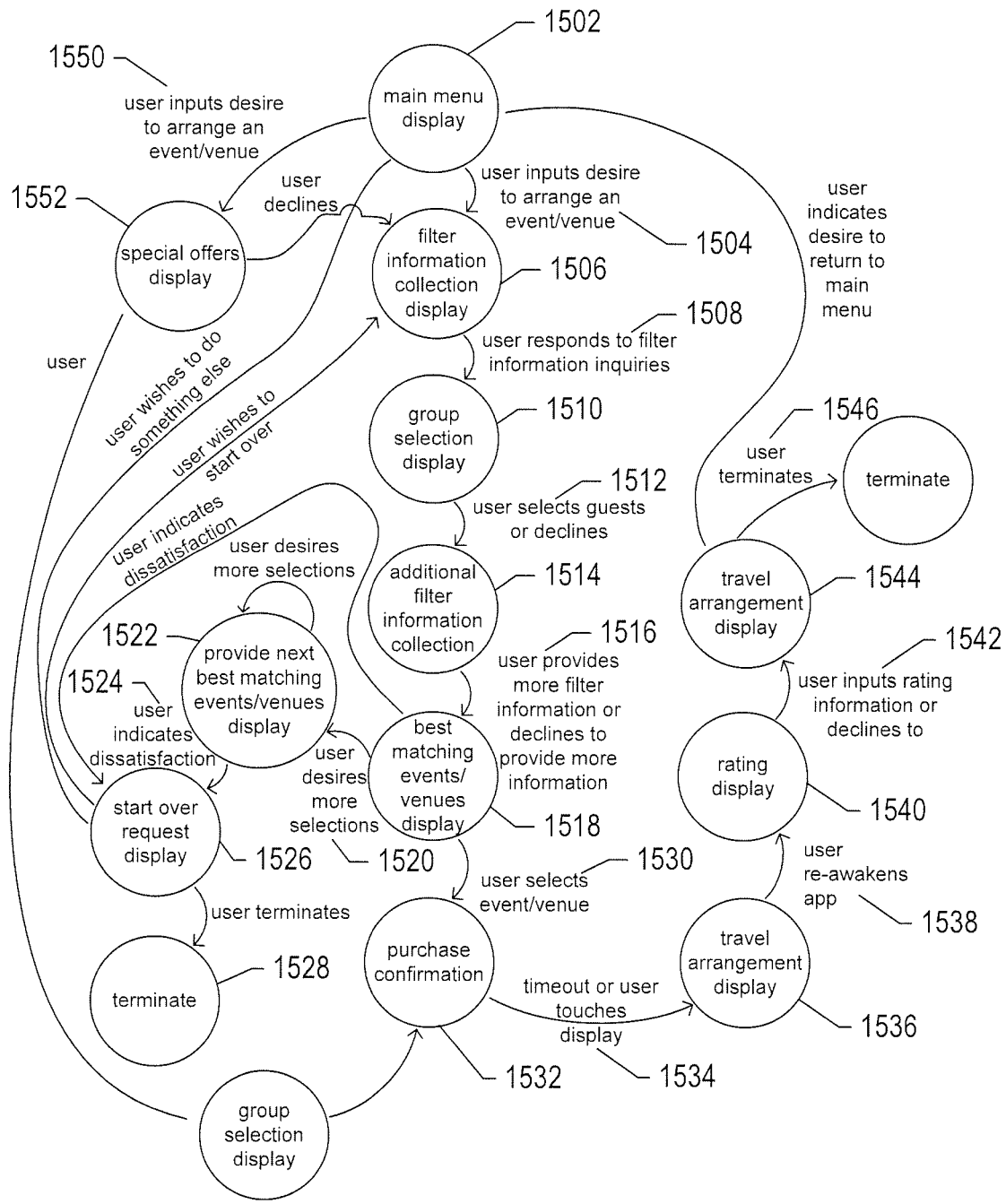
FIG. 15 provides a state-transition diagram for a dialogue between a user and the automated concierge service leading to the user receiving recommendations, selecting a recommendation, and arranging to attend, participate in, or consume the selected recommendation.

FIG. 15 provides a state-transition diagram for a dialogue between a user and the automated concierge service leading to the user receiving recommendations, selecting a recommendation, and arranging to attend, participate in, or consume the selected recommendation. In state 1502, the automated concierge service displays a main menu. When the user inputs a desire to arrange an event or venue 1504, the client-side application displays a filter-information-collection feature or features 1506. When the user responds to the filter-information-collection features 1508, the client-side application displays a group-selection feature 1510 through the user selects guests to include in the selected event or venue. When the use selects guests 1512 or declines to select guests, the client-side application notifies selected guests and may undertake providing additional services to the selected guests and then displays features requesting additional filter information 1514. When the user provides the additional information or declines to provide more information 1516, the client-side application communicates the collected information to the cloud service, which carries out the matching operation discussed above in order to determine a small set of best matching events or venues and displays these events to the user in state 1518. If the user indicates a desire for more selections 1520, the client-side application may again interact with the cloud service to obtain additional selections, which are provided to the user in step 1522. Should the user indicate dissatisfaction 1524, the client-side application displays a start-over request 1526. If the user wishes to start over event/venue arrangement, the client-side application may transition either back to the main menu display 1502 or to filter information collection 1506, depending on the level of starting over indicated by the user. Otherwise, the client-side application terminates 1528. When the user selects an event or venue from the recommended set of events and venues 1530, the client-side application displays a purchase confirmation 1532. Additional user input or a display timeout 1534 results in the client-side application displaying a request for travel-arrangement information 1536. At this point, the user is directed to travel-arrangement services. Eventually, once the user has traveled to and attended the selected event or venue, the user reawakens the client-side application 1538 which displays a rating request 1540. When the user inputs requested rating information 1542, or declines to do so, the client-side application again displays the request for travel-arrangement information 1544. Again, the user is directed to any of various travel services. Eventually, either the user terminates the client-side application 1546 or the client-side application again displays the main menu. In certain cases, when the user inputs a desire to arrange an event or venue 1550, the client-side application may display a special offers page or feature 1552 that allows the user to select various special-offer events or venues. Of course, the state-transition diagrams shown in FIGS. 14-15 are but two examples of many different possible types of user/automated-concierge-service dialogues and interactions.

Figure 16A:
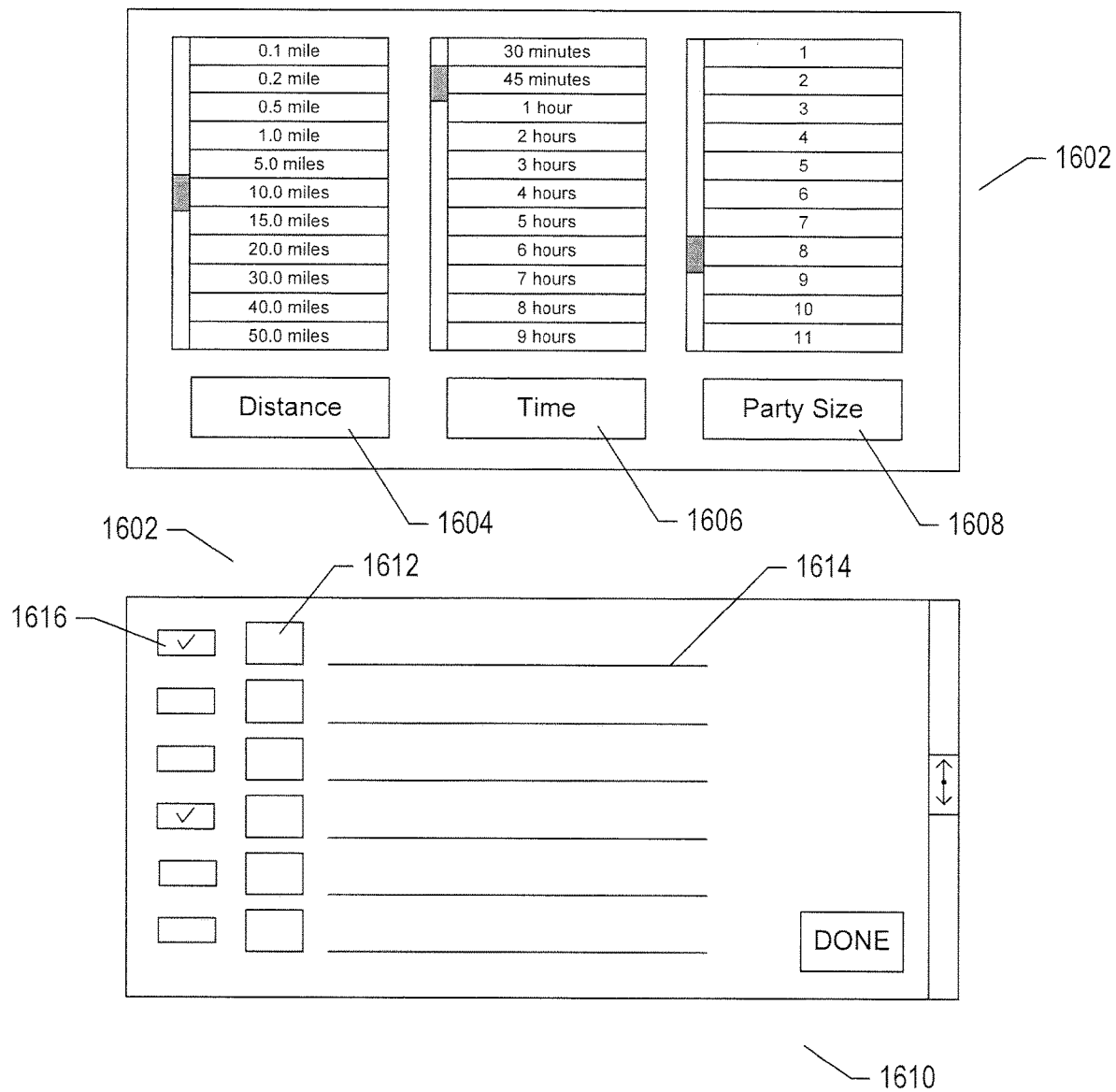
FIGS. 16A-B provide examples of the features and user-interface pages displayed to a user during the event/venue search and selection process discussed with reference to FIG. 15.
Figure 16B:
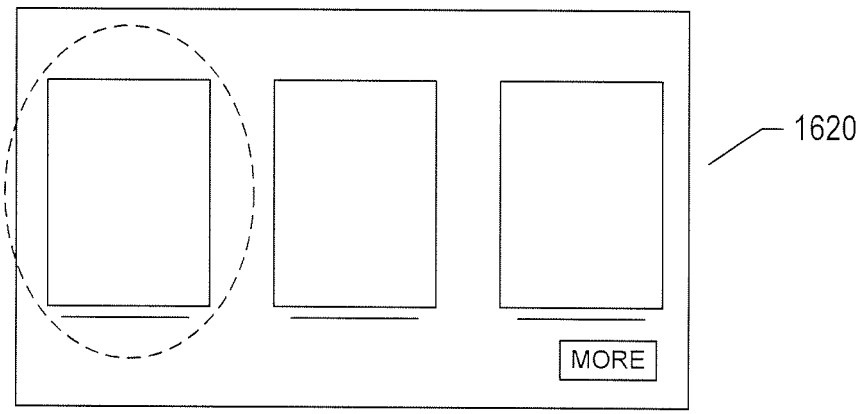
Figure 16B:
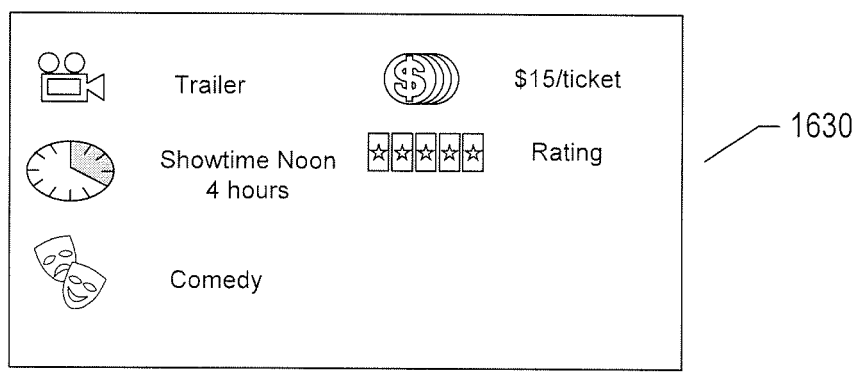
Figure 16B:
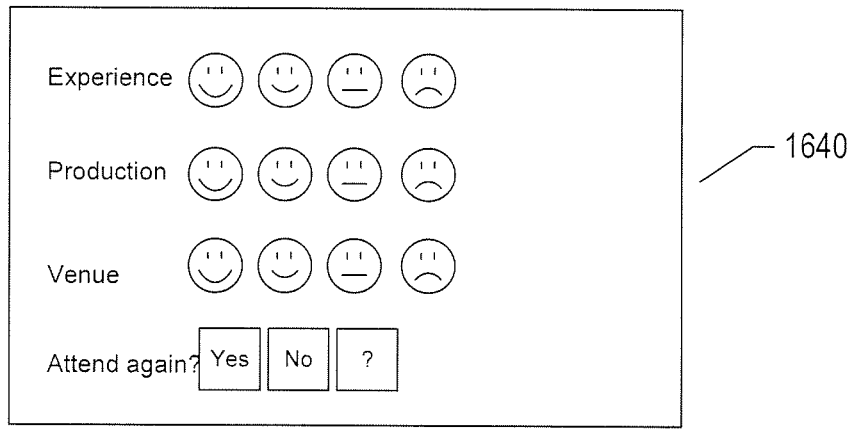

FIGS. 16A-B provide examples of the features and user-interface pages displayed to a user during the event/venue search and selection process, discussed above with reference to FIG. 15. A filter-information-collection feature 1602 shown in FIG. 16A, displayed in state 1506 by the client-side application, as shown in FIG. 15, efficiently and straightforwardly collects, from a user, an indication of the maximum distance the user is willing to travel to an event or venue 1604, an indication of the minimum time between the current time and the time that the event or venue is available 1606, and the number of people desired by the user to attend the event or venue 1608. The filter-collection feature is designed to be easily understood and the options quickly selectable in order to facilitate carrying out a search for events and venues and's selection and arrangement of user attendance or participation within a minute or less. The additional-participants-selection feature 1610, shown in FIG. 16A and displayed in state 1510 in FIG. 15, displays a small thumbnail picture 1612 and textual information 1614 for each potential additional participant selected by the automated concierge service on behalf of the user, along with an input feature 1616 allows the user to include any or all of the potential additional participants recommended by the automated concierge service. Here again, the automated concierge service attempts to display a relatively small number of potential additional participants based on having learned a user's preferences over time, in order to facilitate quick additional-participants selections so that the entire session, illustrated in FIG. 15, can be carried out in a minute. Similar design characteristics are also used for the recommendations-display feature 1620 shown in FIG. 16B, a descriptive-information display feature 1630 provided for recommended events venues following user input to the recommendation-display feature 1620, and a rating-input feature 1640 displayed to a user in state 1540 of FIG. 15. The recommendations-display feature 1620, displayed in state 1518 in FIG. 15, generally shows only a small number, such as three, recommended venues or events to a user in order to facilitate rapid selection and the completion of the entire process shown in FIG. 15 within a minute. This is possible because, as discussed above, the automated concierge system continuously collects and assimilates, using machine-learning technologies, information about a user's behaviors, preferences, and other characteristics so that the automated concierge system can confidently provide recommendations that are precise, relevant to, and desired by a user.

Figure 17:
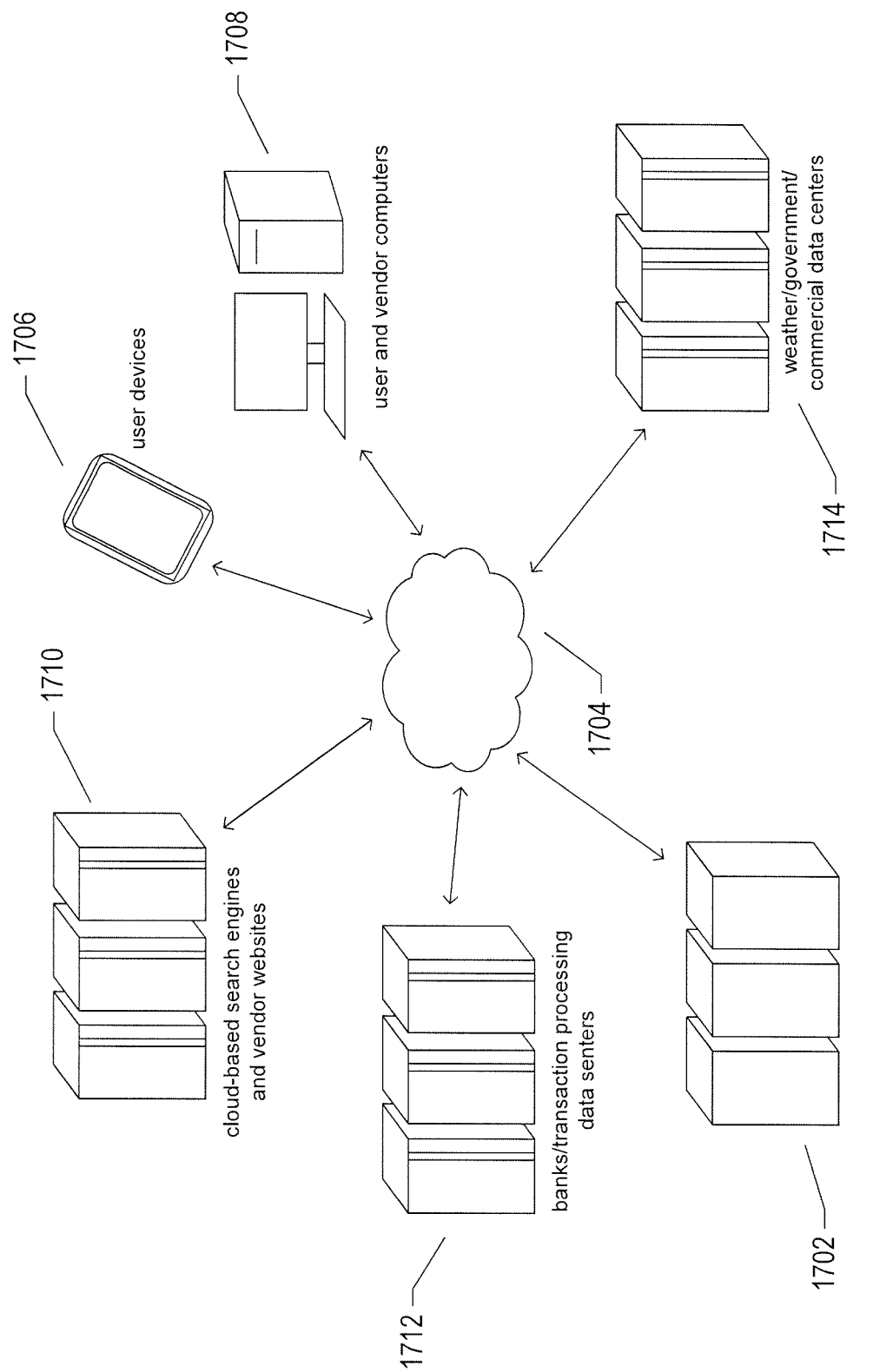
FIG. 17 illustrates the large number of sources of information continuously monitored by the automated concierge service.

FIG. 17 illustrates the large number of sources of information continuously monitored by the automated concierge service. As discussed above, the automated concierge service 1702 is implemented as a cloud service within a cloud-computing facility, in the disclosed implementation. The automated concierge service is connected, through the Internet, public communications systems, and other communications media 1704 to user devices 1706, computer systems owned and/or used by users and vendors 1708, cloud-based search engines and vendor websites 1710, banks, transaction-processing institutions and services, and other such data centers 1712, and a variety of online information sources 1714, including weather services, government-provided information, commercial information services, and other such information. By continuing to monitor all of these types of information sources by using a variety of different machine-learning technologies, the automated concierge service is able to maintain up-to-date information about events, venues, services, and other items of potential interest to users as well as to maintain and continuously update a large knowledge base for which user's preferences, behaviors, and other characteristics can be quickly and efficiently obtained. In essence, the automated concierge service provides personalized concierge services and a level far surpassing the capabilities of a human concierge.

The present invention has been described in terms of particular embodiments, is not intended that the invention be limited to these embodiments. Modifications within the spirit of the invention will be apparent to those skilled in the art. For example, any of many different implementations of the currently disclosed automated concierge service can be obtained by varying various design and implementation parameters, including modular organization, control structures, data structures, hardware, operating system, and virtualization layers, and other such design and implementation parameters.

The invention claimed is:

1. An automated concierge service comprising:
 a cloud service, implemented by multiple application instances executing on multiple servers within a cloud-computing facility, including one or more processors and one or more memories, the cloud service
  receiving requests from client-side applications running on user devices, such as user smart phones, and responding to the received requests,
  requesting and receiving information from web sites, information services, user computers, vendor computers, the user devices, and other information sources,
  storing information in a database that includes representations of entities, including events, venues, user-consumable services, and items, the representations including attribute values for attributes that characterize the entities, and
  storing information in the database that includes representations of users, including user attribute values and weights associated with potential matches between user attributes and entity attributes, and
  employing machine learning to continuously adjust and optimize the weights, user attribute values, and other information and logic used by the cloud service to provide recommendations to users; and
 client-side applications that run on the user devices to provide an automated-concierge-service user interface through which the users
  request the recommendations,
  receive and view the recommendations, wherein the recommendations comprise recommendations of the events, the venues, the user-consumable services, and the items,
  select the events, the venues, the user-consumable services, and the items from among the displayed recommendations of the events, the venues, the user-consumable services, and the items, and
  arrange to attend, participate in, and/or consume the selected events, the selected venues, the selected user-consumable services, and the selected items,
 a set of computational entities that include the one or more processors, the one or more memories, and one or more data-storage devices; and
 computer instructions that execute on one or more of the one or more processors and that implement
  a first component that
   receives data streams containing inventory data for each of multiple management services and/or applications that provide management functionalities with respect to a distributed-computing facility, and
   processes the received data streams to generate and maintain stored data that represents correlations between synthetic keys generated and used by the multiple management services and/or applications to identify computational resources in the distributed-computing facility, and
  a second component that
   receives requests from requesting computational entities, uses the stored data that represents correlations between the synthetic keys used by the multiple management services and/or applications to generate responses to the requests, and transmits the responses to the requesting computational entities.

\* \* \* \* \*